US010983855B2

(12) United States Patent
Darwin et al.

(10) Patent No.: US 10,983,855 B2
(45) Date of Patent: Apr. 20, 2021

(54) INTERFACE FOR FAULT PREDICTION AND DETECTION USING TIME-BASED DISTRIBUTED DATA

(71) Applicant: Microsoft Technology Licensing, LLC, Redmond, WA (US)

(72) Inventors: Cosmos Darwin, Bellevue, WA (US); Bryan S. Matthew, Seattle, WA (US); Donald MacGregor, Lynnwood, WA (US); Scott Chao-Chueh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 16/416,105

(22) Filed: May 17, 2019

(65) Prior Publication Data

US 2020/0257448 A1    Aug. 13, 2020

Related U.S. Application Data

(60) Provisional application No. 62/804,639, filed on Feb. 12, 2019.

(51) Int. Cl.
*G06F 12/00*    (2006.01)
*G06F 13/00*    (2006.01)
(Continued)

(52) U.S. Cl.
CPC ............ *G06F 11/079* (2013.01); *G06F 3/061* (2013.01); *G06F 3/067* (2013.01); *G06F 3/0614* (2013.01);
(Continued)

(58) Field of Classification Search
CPC ...... G06F 3/061; G06F 3/0614; G06F 3/0653; G06F 11/3409
(Continued)

(56) References Cited

U.S. PATENT DOCUMENTS 6,975,963 B2    12/2005  Hamilton et al.
7,577,770 B2     8/2009  Tanaka et al.
(Continued)

FOREIGN PATENT DOCUMENTS

CN       107590069 A     1/2018
WO       2014051603 A1   4/2014

OTHER PUBLICATIONS

"International Search Report and Written Opinion Issued in PCT Application No. PCT/US2020/015507", dated May 18, 2020, 16 Pages. (MS# 406003-WO-PCT).
(Continued)

*Primary Examiner* — Charles Rones
*Assistant Examiner* — Sidney Li
(74) *Attorney, Agent, or Firm* — Newport IP, LLC; Han Gim

(57) ABSTRACT

Techniques are disclosed for generating and utilizing a time-based distribution of I/O latency and other performance characteristics to identify potential device failures in a system that includes storage devices, such as a distributed software-defined storage system. A user interface is implemented that allows users to request and selectively view I/O latency and other data over a configurable time-based or histogram-based distribution. The user interface further enables comparison of the I/O latency distribution to data from other devices in the same class to identify potential failures.

20 Claims, 17 Drawing Sheets

(51) Int. Cl.
*G06F 13/28* (2006.01)
*G06F 11/07* (2006.01)
*G06F 3/06* (2006.01)

(52) U.S. Cl.
CPC ........ *G06F 3/0653* (2013.01); *G06F 11/0727* (2013.01); *G06F 11/0757* (2013.01); *G06F 11/0793* (2013.01)

(58) Field of Classification Search
USPC ....................................................... 711/154
See application file for complete search history.

(56) References Cited

U.S. PATENT DOCUMENTS

| | | | |
|---|---|---|---|
| 8,467,281 | B1 | 6/2013 | Colon et al. |
| 8,972,799 | B1 | 3/2015 | Brooker et al. |
| 9,081,828 | B1 | 7/2015 | Martin et al. |
| 9,798,474 | B2 | 10/2017 | Barzik et al. |
| 2009/0089503 | A1 | 4/2009 | Yoshida et al. |
| 2009/0106602 | A1 | 4/2009 | Piszczek et al. |
| 2009/0293051 | A1* | 11/2009 | Krywaniuk ............... G06F 8/63 717/173 |
| 2012/0151276 | A1 | 6/2012 | Bjorner et al. |
| 2013/0254591 | A1* | 9/2013 | Mickael ............. G06F 11/1402 714/6.11 |
| 2014/0229608 | A1 | 8/2014 | Bauer et al. |
| 2016/0099844 | A1 | 4/2016 | Colgrove et al. |
| 2016/0283119 | A1 | 9/2016 | Frickey et al. |
| 2016/0285707 | A1 | 9/2016 | Pawlowski et al. |
| 2017/0090779 | A1 | 3/2017 | Barzik et al. |
| 2017/0147425 | A1 | 5/2017 | Waheed |
| 2017/0235622 | A1 | 8/2017 | Boyapalle et al. |
| 2018/0060193 | A1 | 3/2018 | Knauft et al. |
| 2019/0354454 | A1* | 11/2019 | Shmouely ........... G06F 9/45558 |
| 2020/0242000 | A1 | 7/2020 | Khosrowpour et al. |
| 2020/0257581 | A1 | 8/2020 | Darwin et al. |

OTHER PUBLICATIONS

"International Search Report and Written Opinion Issued in PCT Application No. PCT/US2020/015508", dated May 19, 2020, 15 Pages. (MS# 406535-WO-PCT).

Sigovan et al., "A Visual Network Analysis Method for Large Scale Parallel I/O Systems", In Proceedings of IEEE 27th International Symposium on Parallel and Distributed Processing, May 20, 2013, pp. 308-319.

"Application Filed in U.S. Appl. No. 15/989,680", filed May 25, 2018, 63 Pages.

"Non Final Office Action issued in U.S. Appl. No. 16/416,107", dated Nov. 25, 2020, 28 Pages. (MS# 406535-US-NP).

"Notice of Allowance Issued in U.S. Appl. No. 16/416,107", dated Feb. 22, 2021, 11 Pages.

* cited by examiner

INTERFACE FOR FAULT PREDICTION AND DETECTION USING TIME-BASED DISTRIBUTED DATA

CROSS-REFERENCE TO RELATED APPLICATIONS

This application claims the benefit of U.S. Provisional Patent Application No. 62/804,639 entitled "FAULT PREDICTION AND DETECTION USING TIME-BASED DISTRIBUTED DATA," which was filed on Feb. 12, 2019, and which is expressly incorporated herein by reference in its entirety.

BACKGROUND

A data center is a facility that houses computer systems and various networking, storage, and other related components. Data centers may, for example, provide computing services to businesses and individuals as a remote computing service or provide "software as a service" (e.g., cloud computing).

When a failure of a component such as a storage device occurs, data center users may lose data and may be unable to provide services to their downstream clients, resulting in lost revenue and user dissatisfaction. Troubleshooting storage and other I/O issues may be difficult to perform given the complexity of the networks in data centers. Production loss and inefficiencies with respect to computing resources can be exacerbated when the data center is unable to quickly isolate and correct the cause of a device issue. It is with respect to these considerations and others that the disclosure made herein is presented.

SUMMARY

It is desirable to provide the highest level of data storage availability and resiliency while at the same time providing performance and minimizing cost. It is also desirable to avoid faults and to take corrective or preemptive action before faults occur. In a system with storage devices, a performance issue in a single storage device can lead to performance issues for storage resources that are allocated across multiple storage devices, for example when mirroring or parity resiliency schemes are implemented. As used herein, such resiliency schemes may also be referred to as a resiliency function or resiliency mechanism.

Some methods attempt to identify failures using specialized and disruptive diagnostics such as installing special firmware or injecting added data traffic, which can cause delays or disruptions and may produce mixed results. Some storage systems attempt to identify faults by measuring the average latency for input/output (I/O) operations to individual storage devices. However, taking the average may mask many performance issues. For example, existing techniques that measure the average latency do not readily identify device failure modes that involve a relatively small number of I/O operations that exhibit excessive latency.

The disclosed embodiments describe technologies for generating and utilizing a distribution of I/O latency and other performance characteristics to identify potential device failures in a system that includes storage devices, such as a distributed software-defined storage system. The distribution may be based on time or other bases. For example, one distribution can be I/O latency values plotted on a time axis. Tail latencies, or higher percentile latencies, may be used. This can provide advantages to resiliency/redundancy schemes, where storage devices are combined into logical units using mirroring or parity or other erasure coding schemes. Taking a storage device offline or allowing the storage device to fail before replacing the device may significantly impact the resiliency guarantees associated with such schemes. For example, a storage device that is exhibiting behavior that is indicative of a potential failure can be load balanced with some I/O requests being routed to other devices. By diverting some requests, the device may be allowed to internally recover and eventually resume normal operation. Alternatively, a replacement device may be selected and populated with data so that it can replace the potentially failing device before such a failure actually occurs. Other preemptive actions may also be taken.

In one aspect, a user interface may be implemented that allows users to request and selectively view I/O latency and other data over a configurable time-based or histogram-based distribution. The user interface enables comparison of the I/O latency distribution to data from other devices in the same or similar class to identify potential failures. This may allow data centers to more effectively adhere to operational objectives and at the same time improve operating efficiencies.

In many data centers, I/O issues may cause patterns of delays or drops of a percentage of data packets. I/O issues may also affect data storage resiliency. For example, physical disk drive components may be combined into one or more logical units to provide data redundancy and performance improvement. Data may also be distributed across the drives depending on the desired level of redundancy, performance, reliability, availability, and capacity. Different levels of resiliency can be achieved, for example, by different mirroring schemes or parity schemes.

Issues with storage devices can have a negative impact on performance and the user experience and may be difficult to isolate. As the data center scale grows, detecting and fixing these faulty devices are becoming even more important. At the same time, identifying such devices can be difficult, and unfocused attempts to collect latency data may result in a large amount of data that must be processed potentially without generating any actionable intelligence. The data center can thus spend a considerable amount of time and effort attempting to isolate I/O faults, which can lead to extensive and unnecessary consumption of computing resources.

In a system with storage devices, a performance issue in a single storage device can lead to performance issues for storage resources that are allocated across multiple storage devices. Some methods attempt to identify failures using specialized and disruptive diagnostics such as installing special firmware or injecting added data traffic, which can cause delays or disruptions and may produce mixed results. Some storage systems attempt to identify faults by measuring the average latency for input/output (I/O) operations to individual storage devices. However, taking the average may mask many performance issues. For example, existing techniques that measure the average latency do not readily identify device failure modes that involve a relatively small number of I/O operations that exhibit excessive latency. If such issues are not identified in a timely manner, downtime and data loss may occur, leading to a poor user experience.

In various embodiments, methods and systems are disclosed for generating and utilizing a distribution of I/O latency and other characteristics to identify potential device failures and states in a storage network. A user interface may be implemented that allows users to request and selectively view the I/O latency and other data over a configurable time-based or histogram-based distribution. The user interface further enables comparison of the I/O latency distribution to data from other devices in the same class to identify potential failures. For example, the UI may provide a histogram of latency ranges and the number of I/O operations with latencies that fell within each range. The UI can be rendered on a display or implemented as a programming interface where the data can be returned to a requesting client.

In some embodiments, the UI can also be configured to specify threshold values for I/O latencies and view a time-based distribution. For example, a system can receive, via the UI, a latency threshold and a time range from a user input. The latency threshold and time range can be utilized to control the display of I/O operations that exceed the threshold, and their distribution over time.

In some embodiments, the system can further be configured to provide notifications that may be triggered when a percentage of I/O operations exceed a specified latency for a given time duration.

In some embodiments, techniques may be implemented for using the distributed I/O latency and other time-based data to predict storage device failures and other device states. The time-based distributed data can be referred to herein as distributed behavioral and characteristic data. The distributed behavioral and characteristic data can be used to identify outlying or deviant behavior as compared to other devices within the same class or grouping. For example, a device with a latency profile that is statistically deviant compared to a characteristic profile for other devices of the same class or grouping can indicate a high probability that a failure will occur within a threshold period of time. The system can automatically identify and report potential failures based on thresholds and parameters that are configured via the UI. The failure probability can be adjusted based on actual observed failures.

In an embodiment, the threshold can be predetermined. The threshold may also be dynamically updated. The threshold may be based on empirical observations of I/O data for a group of devices. The threshold can also be based on one or more statistical factors such as standard deviation. For example, the threshold can be three or five times the standard deviation for a given parameter.

The behavioral and characteristic data can include the time distribution of I/O latencies as well as other data that can be readily observable or self-reported. Such data can include failure and maintenance data, device temperature, and I/O queue time. The behavioral and characteristic data can be collected across entire populations of devices at the same or across data centers. In one embodiment, the behavioral and characteristic data can exclude the data for the current device of interest. Characteristic patterns can then be identified that are indicative of failures for various classes of devices, allowing for preemptive device maintenance that can be used to avoid downtime and data loss.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
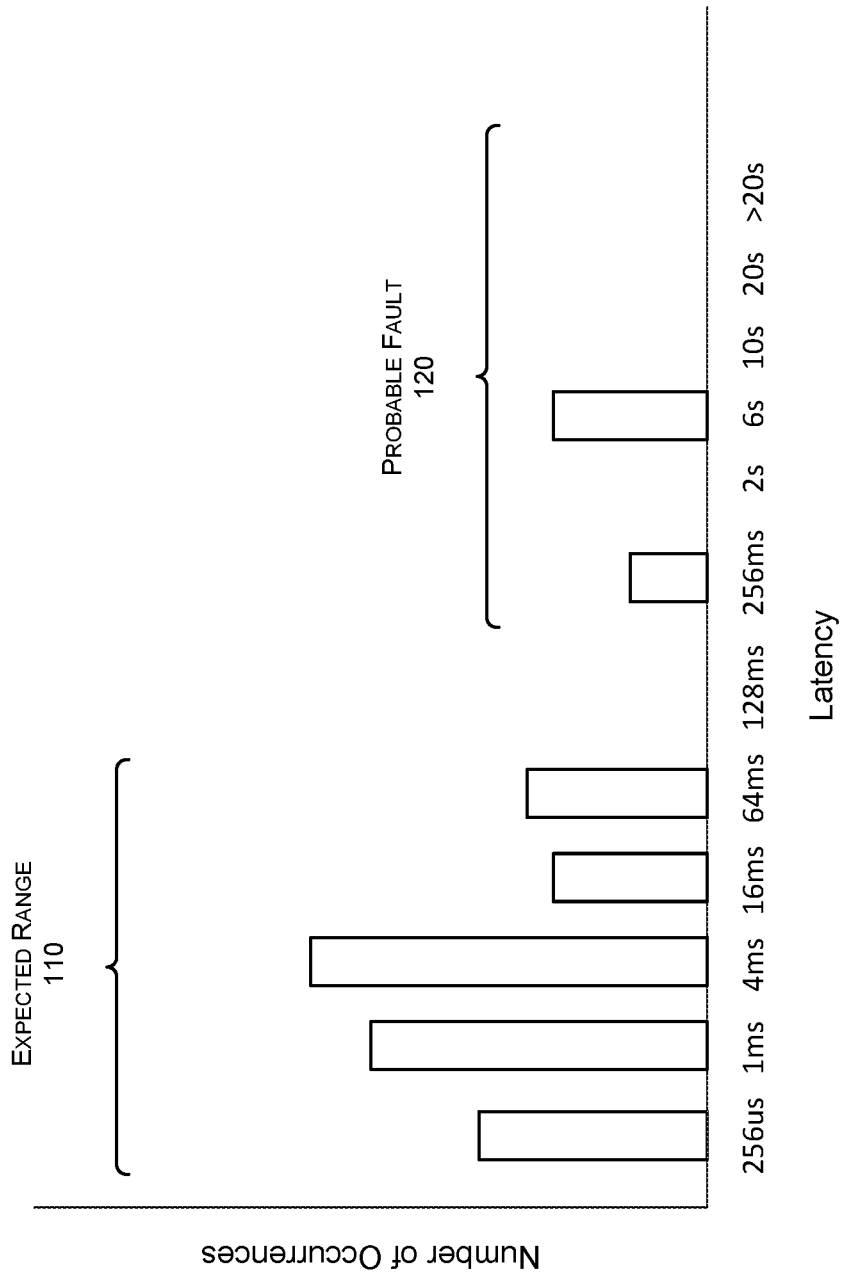
FIG. 1 is a diagram illustrating an example user interface in accordance with the present disclosure.

The following Detailed Description describes technologies for diagnosing storage issues in data centers and other networked environments, including those that provide virtualized services. In particular, disclosed are techniques for generating and utilizing the distribution of I/O latency and other performance characteristics to identify potential device failures in a system that includes storage devices, such as a distributed software-defined storage system. The storage systems may include data backup and recovery schemes such as mirroring and parity schemes. The improvements can include improved data resiliency, reduced downtime, and reduced costs.

The distribution can be over time or other unit that allows for analysis of I/O-related parameters to be analyzed in ways other than using a time-based average. In one aspect, a user interface is implemented that allows users to request and selectively view I/O latency and other data over a configurable time-based or histogram-based distribution. The user interface further enables comparison of the I/O latency distribution to data from other devices in the same class to identify potential failures.

In a system with storage devices, a performance issue in a single storage device can lead to performance issues for storage resources and services that are allocated across multiple storage devices. Some methods attempt to identify failures using specialized and disruptive diagnostics such as installing special firmware or injecting added data traffic, which can cause delays or disruptions and may produce mixed results. Some storage systems attempt to identify faults by measuring the average latency for input/output (I/O) operations to individual storage devices. However, taking the average may mask many performance issues. For example, existing techniques that measure the average latency do not readily identify device failure modes that involve a relatively small number of I/O operations that exhibit excessive latency. Device self-reporting of fault messages may be used, after a fault occurs. However, these methods either fail to identify issues that can be detected using the distribution of data, or fail to identify issues before they manifest into performance issues. It would be useful to identify and predict performance issues and failures of a device, before the failures and performance issues actually occur. This can allow the service provider to take preemptive measures, such as bringing another device on-line, and thus avoiding problems associated with an unexpected loss of a device. If such issues are not identified in a timely manner, downtime and data loss may occur, leading to a poor user experience.

The present disclosure describes ways to generate and utilize the distribution of I/O latency and other characteristics to identify potential device failures and states in a network that utilizes storage devices. In one embodiment, failures that have a threshold probability of occurring are determined so that the service provider can replace devices before a failure actually occurs. The failure predictions may be determined using historical and real time data for the storage devices. The service provider may determine criteria such as a probability at which corrective action should be taken, such as replacing the device, or reducing workload at the device. For example, the provider network can identify a disk drive as having a probability of failure of 95% over the next 10 days. The service provider can determine an objective that it wishes to achieve, such as to have zero actual failures for live devices with a given confidence level, or minimization of I/O latencies that exceed a threshold time period.

In one embodiment, a user interface may be implemented that allows users to request and selectively view the I/O latency and other data over a configurable time-based or histogram-based distribution. The user interface may be configured to enable comparison of the I/O latency distribution for a selected device to I/O latency distribution data for other devices in the same class to identify potential performance issues. For example, the UI may provide a histogram of latency ranges and the number of I/O operations with latencies that fell within each range. FIG. 1 illustrates one example of a UI in accordance with the present disclosure. In the example, a distribution of latencies for a selected storage device is depicted. The vertical axis shows the number of occurrences, and the horizontal axis shows the distribution of recorded latencies. In the figure, each bar represents the total number of I/O operations where the latency was greater than 256 us, 1 ms, 4 ms, etc. The UI can be rendered on a display or implemented as a programming interface where the data can be returned to a requesting client for rendering on a client device. FIG. 1 illustrates a normal range 110 that indicates I/O responses that are considered within the normal range of response times for operations during a typical operational environment. The figure also illustrates a probable fault range 120 that indicates I/O responses that are considered within a range that is predictive of response times for operations that are marginal and may indicate a potential fault.

Figure 2A:
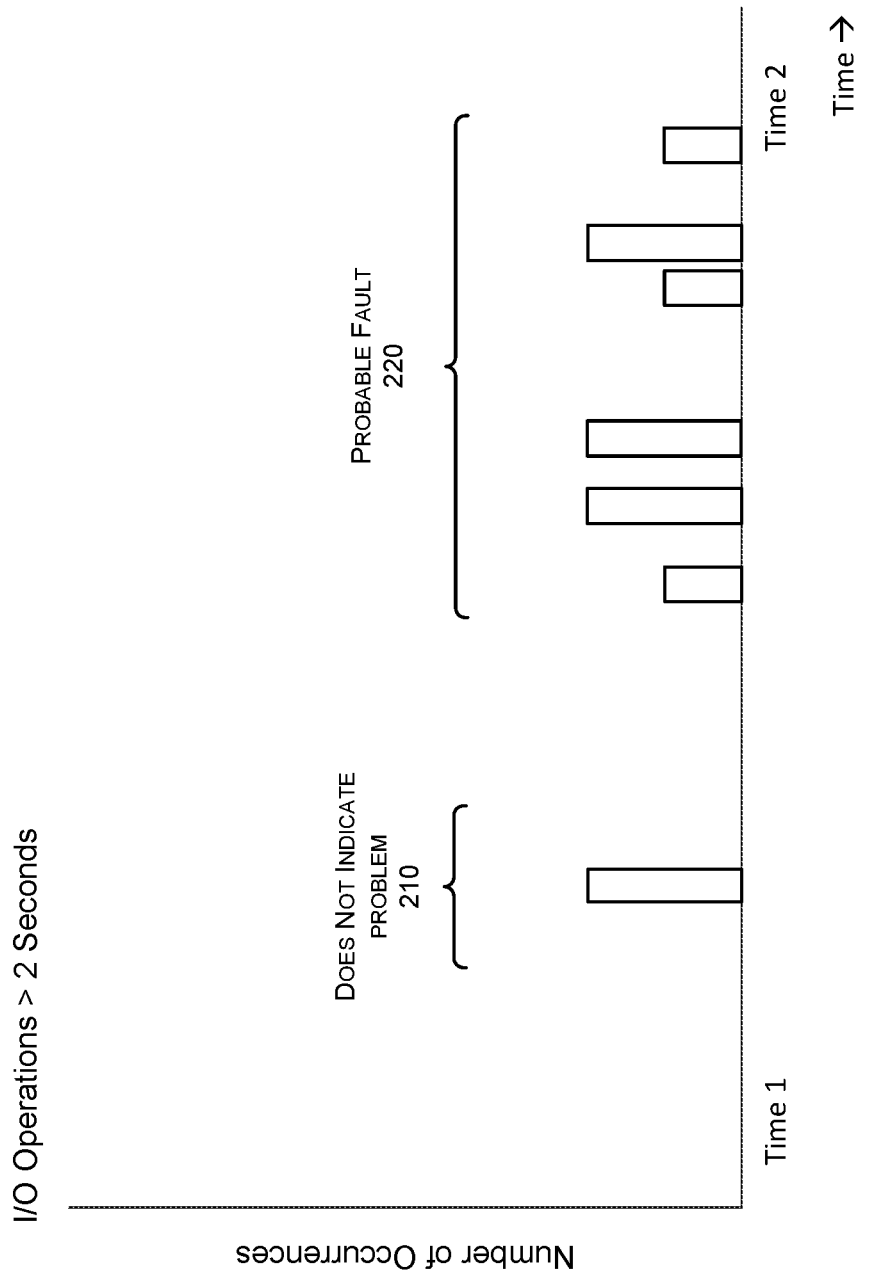
FIG. 2A is a diagram illustrating an example user interface in accordance with the present disclosure.
Figure 2B:
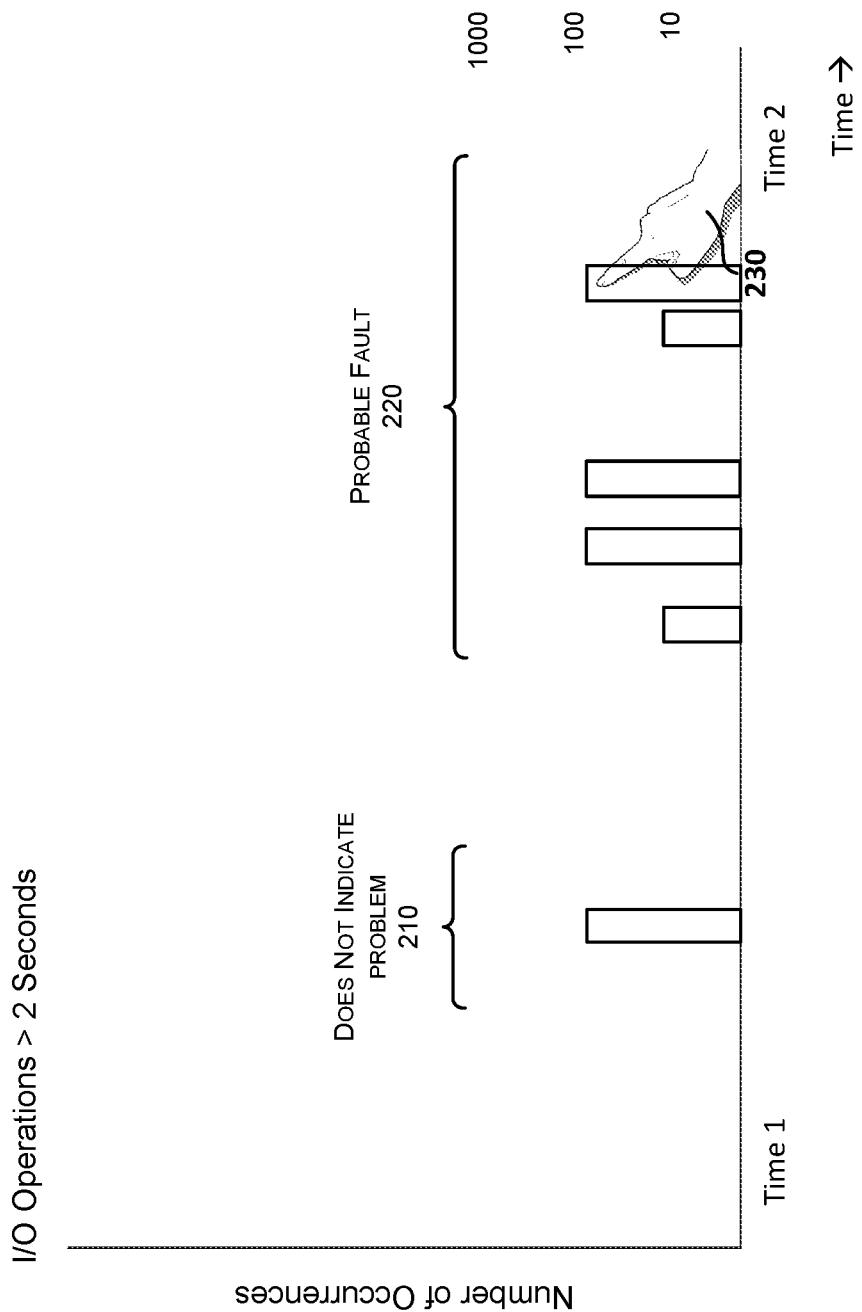
FIG. 2B is a diagram illustrating an example user interface in accordance with the present disclosure.

The UI can also be configured to specify threshold values for I/O latencies and view a time-based distribution. For example, a system can receive, via the UI, a latency threshold and a time range based on a user input. The latency threshold and time range can be utilized to control the display of I/O operations that exceed the threshold, and their distribution over time. FIG. 2 illustrates one example of a UI in accordance with the present disclosure, where latency values that exceeded 2 seconds are shown over a two-week period. In the example illustrated in FIG. 2, a time-based distribution of latencies for a selected storage device that have exceeded a specified latency threshold is depicted. The vertical axis shows the number of occurrences of latencies that have exceeded 2 seconds, and the horizontal axis shows the distribution of recorded latencies over a specified time period. FIG. 2A illustrates an expected distribution 210 that indicates I/O responses that are considered within the normal range where some number of higher latencies may have occurred during a peak usage time for operations during a typical operational environment but does not otherwise indicate a problem. The figure also illustrates a marginal distribution 220 that indicates a larger number of I/O responses that occurred within a time period that are considered within a range that is predictive of pre-marginal or marginal behavior and indicates a probable fault.

Figure 2C:
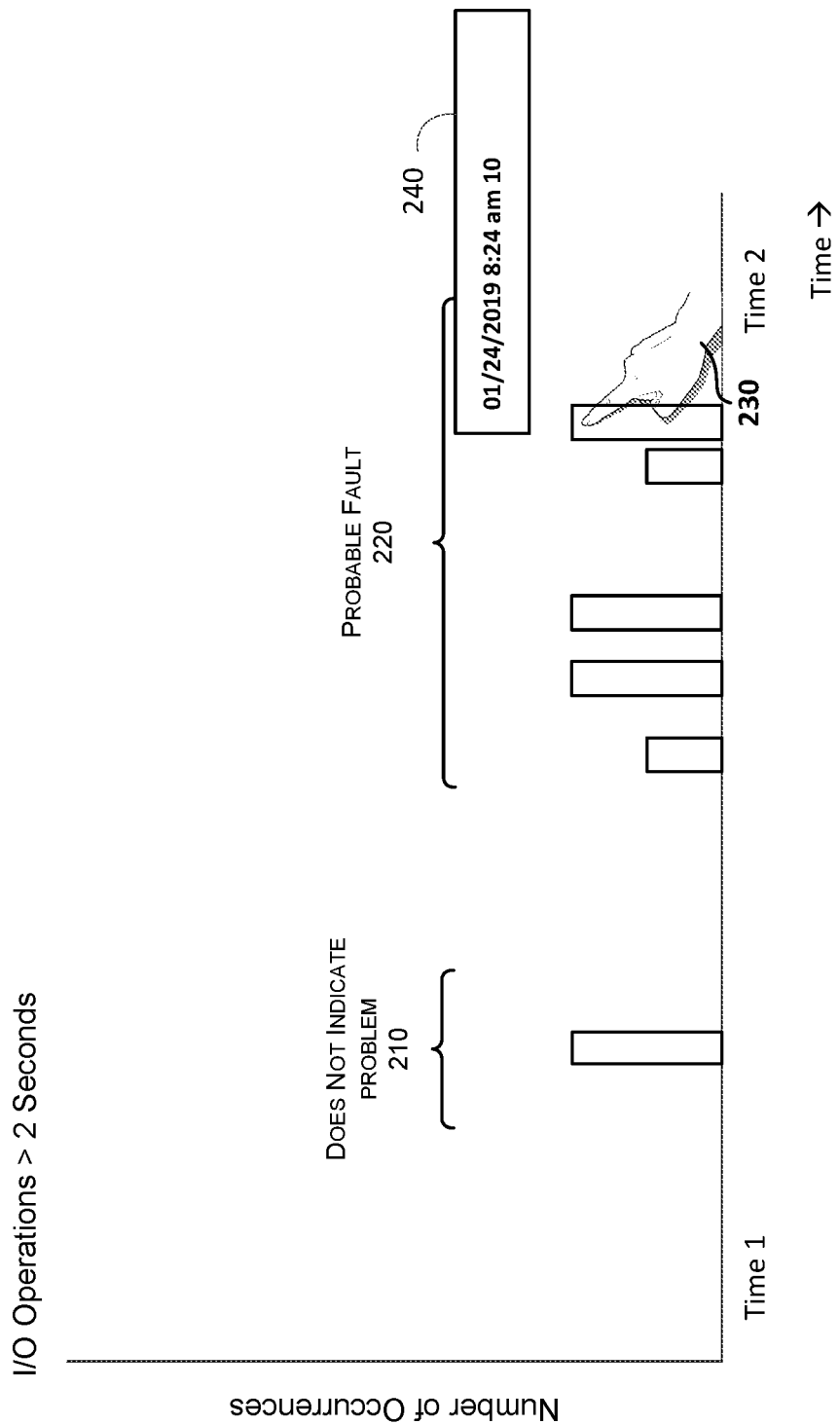
FIG. 2C is a diagram illustrating an example user interface in accordance with the present disclosure.

In some embodiments, a UI may be configured to provide interactive capability through the use of an input device such as a mouse or touchscreen. In the example shown in FIG. 2B, a user may select 230 a set of occurrences of interest. FIG. 2C illustrates that in response to the user selection, further information 240 may be provided for the selected set of occurrences. In one example, the information may include date, time, and number of occurrences.

Figure 2D:
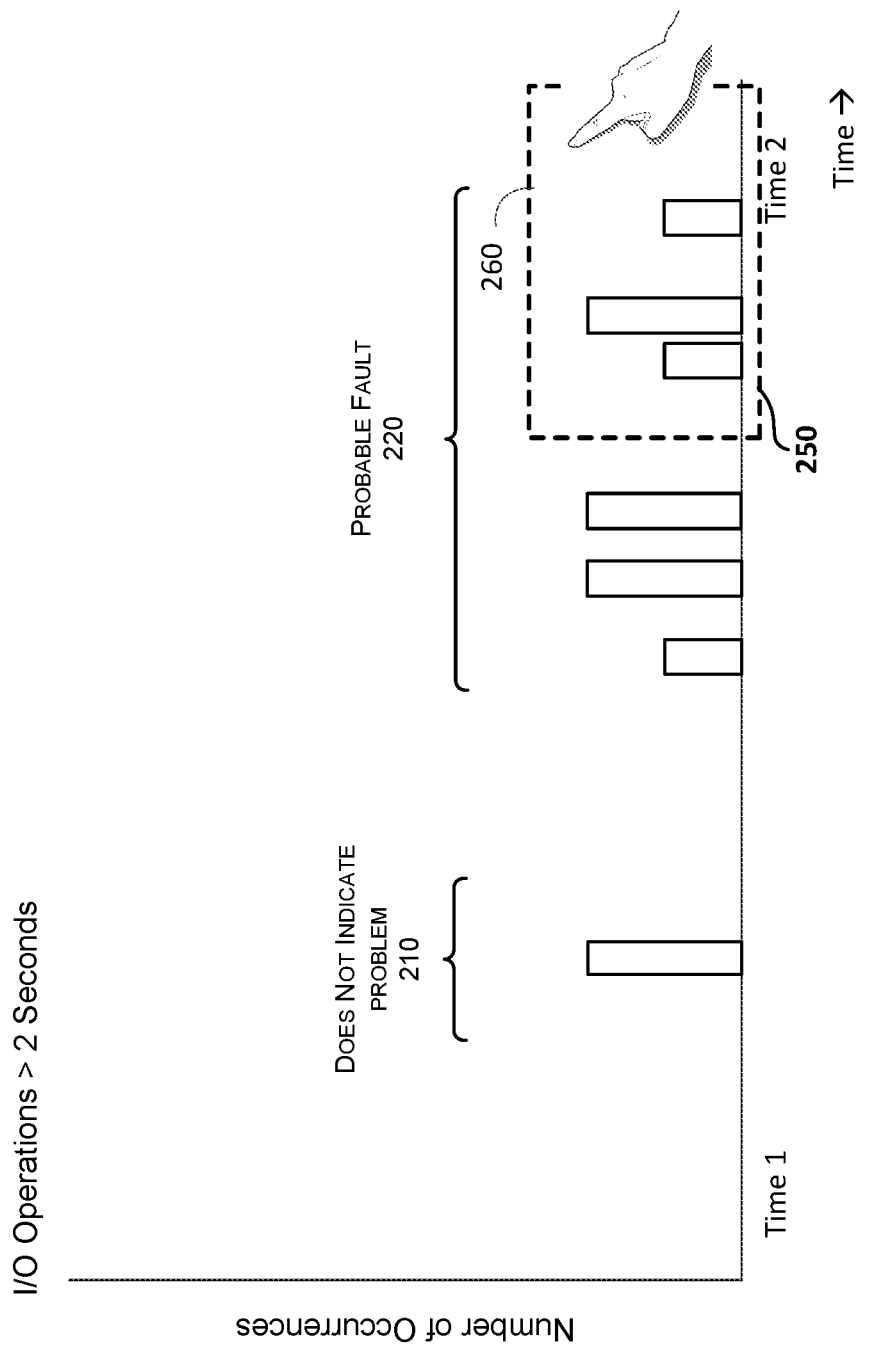
FIG. 2D is a diagram illustrating an example user interface in accordance with the present disclosure.
Figure 2E:
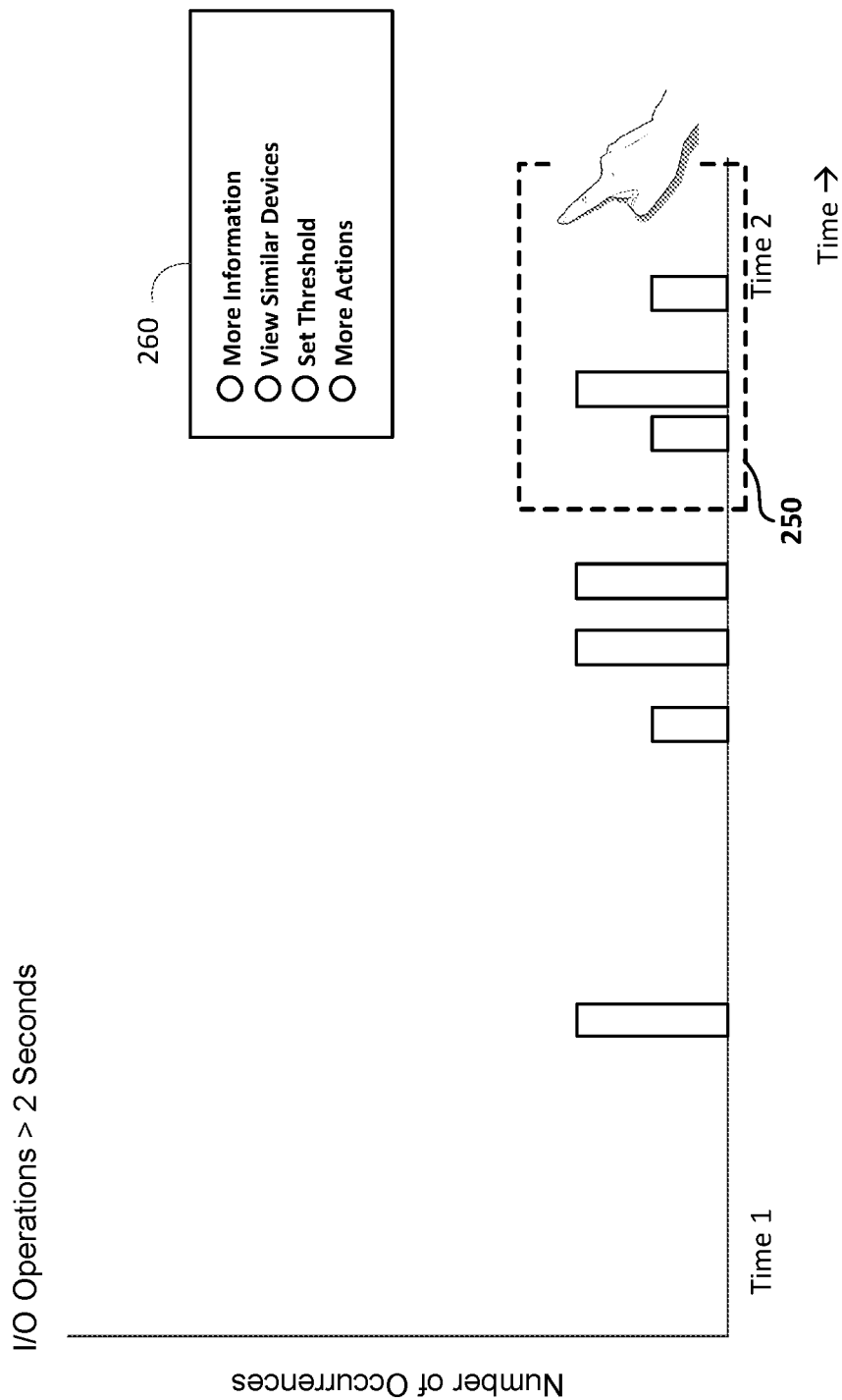
FIG. 2E is a diagram illustrating an example user interface in accordance with the present disclosure.

FIG. 2D illustrates another example where a user may select a range 250 of occurrences for interaction. FIG. 2E illustrates that in response to the user selection, further information 260 may be provided for the selected group of occurrences. In the example, the user may be provided options for accessing more information, viewing profile and other information for similar devices in the same group or elsewhere, set a threshold for further monitoring, and access further actions.

Figure 2F:
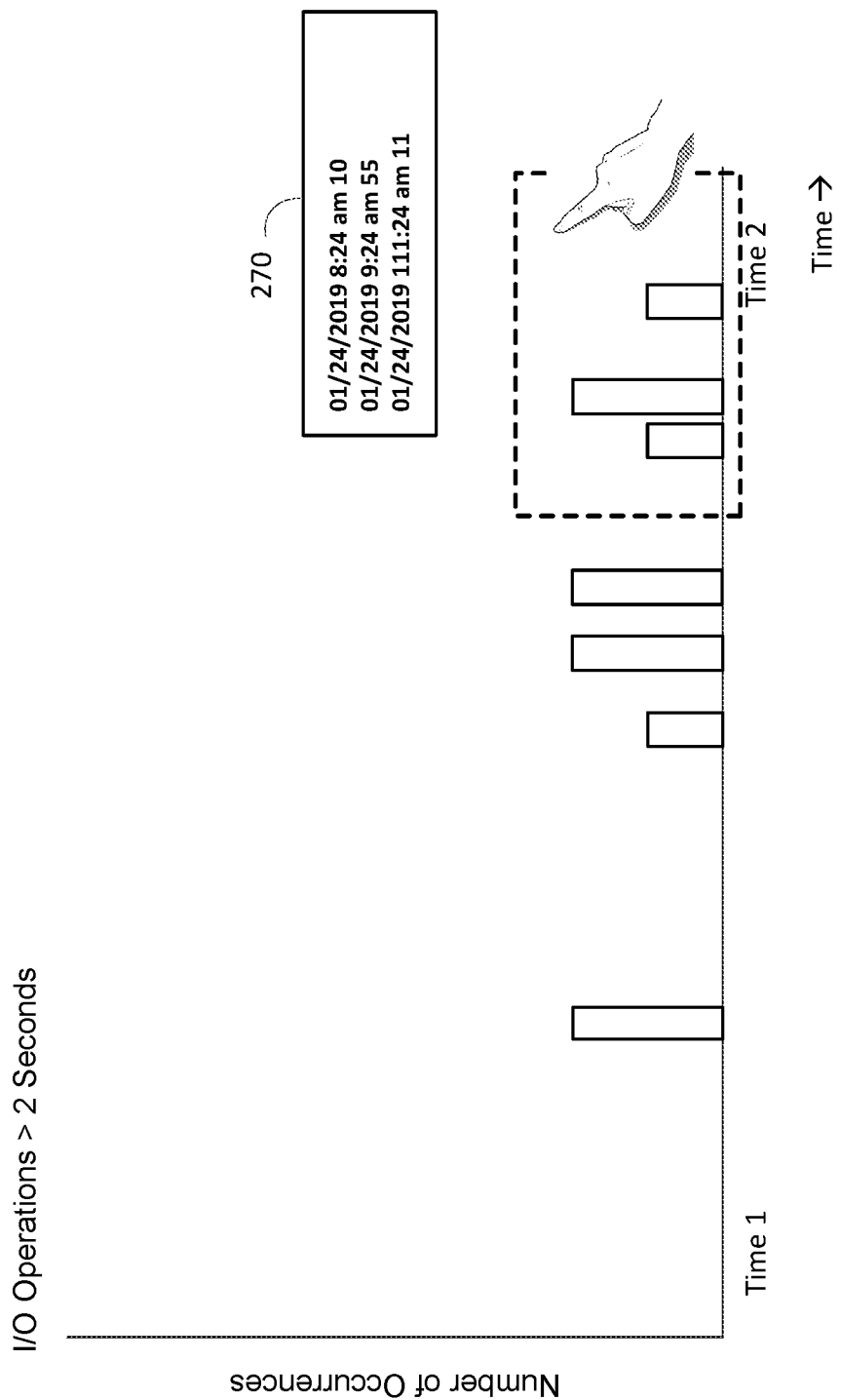
FIG. 2F is a diagram illustrating an example user interface in accordance with the present disclosure.

FIG. 2F illustrates that in response to a further user selection for more information, further information 270 may be provided for the selected group of occurrences. In one example, the information may include date, time, and number of occurrences for each of the histograms in the selected group.

Figure 3A:
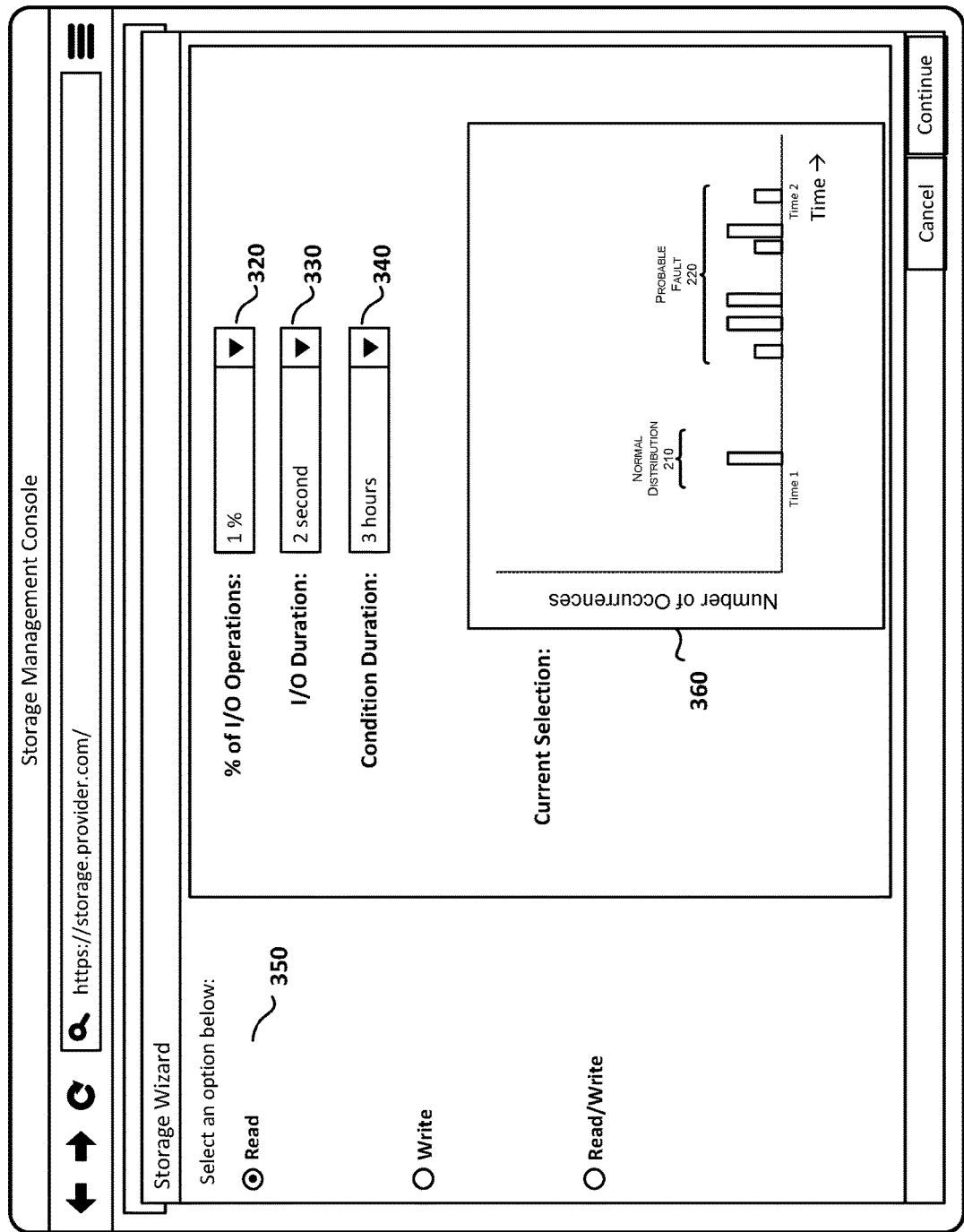
FIG. 3A is a diagram illustrating an example user interface in accordance with the present disclosure.

In an embodiment, the UI and/or a notification function can be configured to provide notifications that may be triggered when a percentage of I/O operations exceed a specified latency for a given time duration. FIG. 3A illustrates one example of a UI in accordance with the present disclosure, where an alert is generated under specified conditions. FIG. 3A illustrates an example of a user interface 300 where storage management interface 310 is rendered. The interface 310 allows a user to specify a percentage of I/O operations 320, duration 330, and condition duration 340. The user may also specify whether the I/O data to be accessed are reads, writes, or a combination 350. The UI may return a depiction of the requested data 360.

Figure 3B:
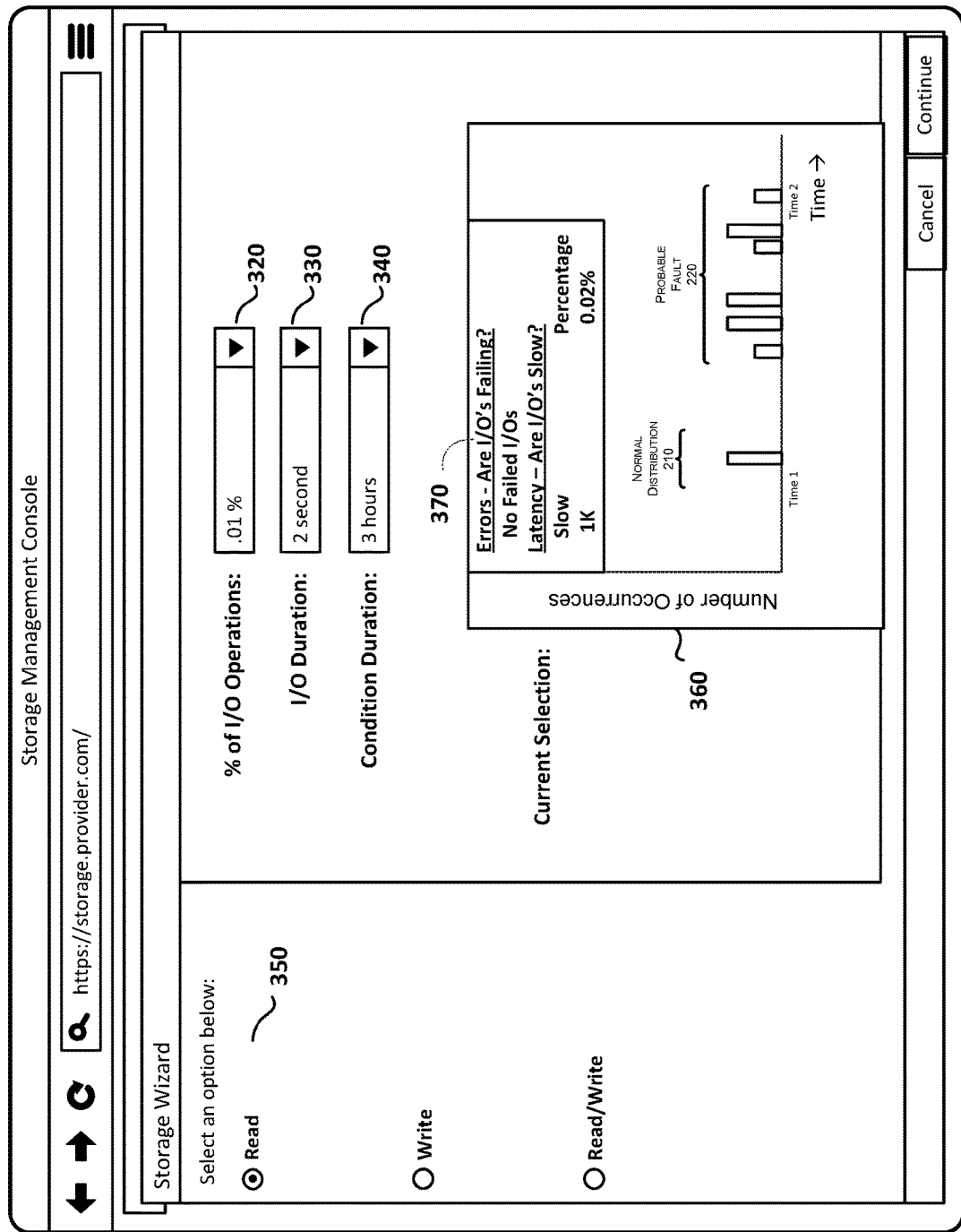
FIG. 3B is a diagram illustrating an example user interface in accordance with the present disclosure.

FIG. 3B illustrates a further example where the interface 310 includes a summary window 370 indicating that for the selected user criteria, there are no failed I/O's, and that there are approximately 1K slow I/O's that make up 0.02% of the I/O's for the device for the selected time period.

Figure 3C:
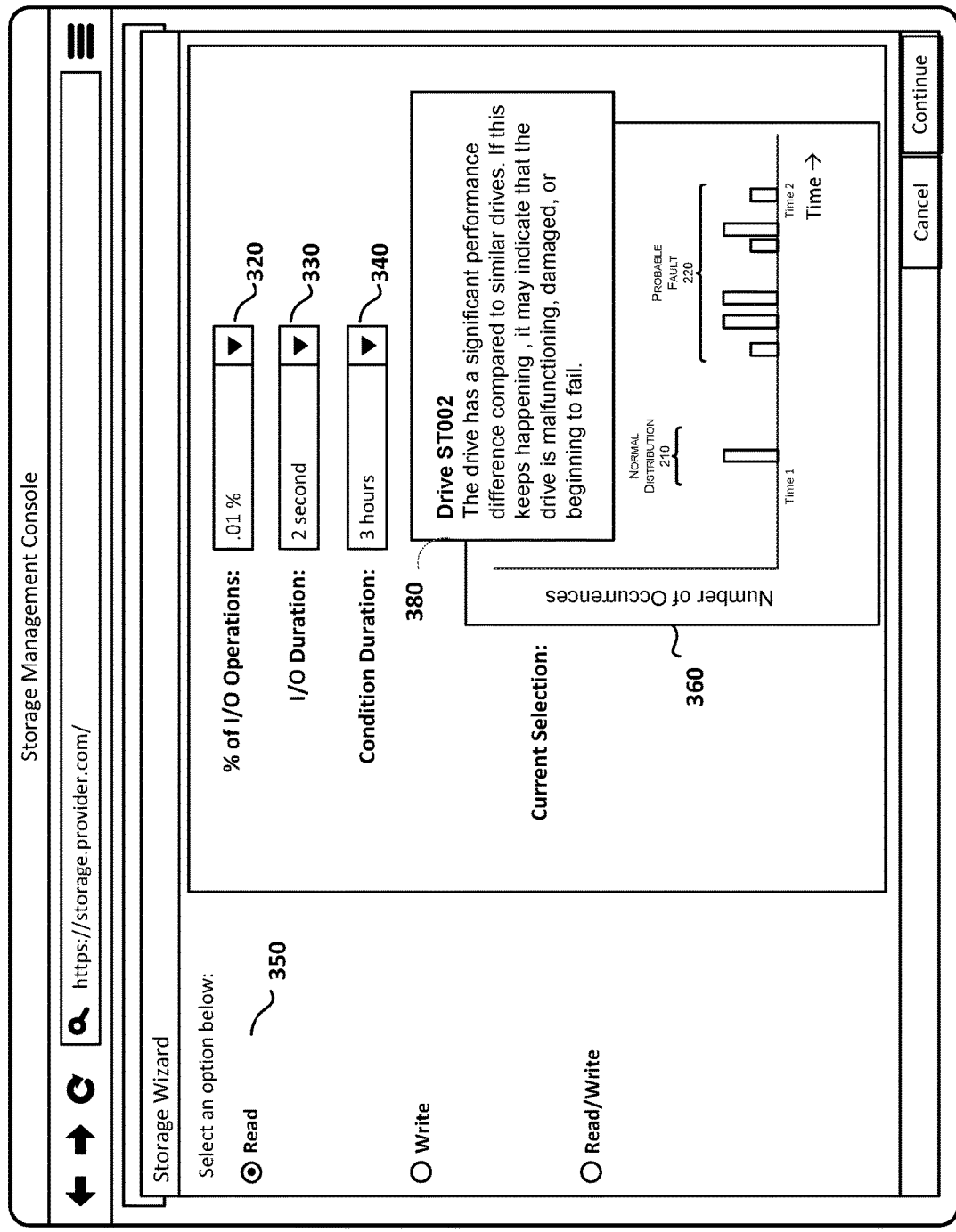
FIG. 3C is a diagram illustrating an example user interface in accordance with the present disclosure.

In another example, FIG. 3C illustrates a further example where the interface 310 includes a warning window 380 indicating that for the selected device, a difference in the profile has been detected when compared to performance profiles for other devices, and that the difference may indicate that the drive is malfunctioning, damaged, or beginning to fail.

The disclosure further describes techniques for using the distributed I/O latency and other time-based distributed data to predict storage device failures and other device states. The time-based distributed data can be referred to generally as behavioral and characteristic data. In some embodiments, the behavioral and characteristic data may be distributed over different units. For example, the behavioral and characteristic data may be plotted on a frequency axis.

In an embodiment, the distribution of I/O latency and other performance characteristics for a given storage device may be used to identify potential device issues. The distribution of I/O latency may be based on time or other bases. For example, tail latencies, or higher percentile latencies, may be used to identify potential device issues. A comparison may be performed of the I/O latency distribution for a storage device to data from other storage devices in the same class to identify whether the storage device is entering a pre-marginal or marginal state. The distribution of I/O latency and other performance characteristics may be used to determine a performance profile for storage device. When the performance profile is determined based on I/O performance information, then the performance profile may be referred to as a time-based I/O performance profile.

The time-based distributed data can be referred to herein as distributed behavioral and characteristic data. In an embodiment, the behavioral and characteristic may be used to identify outlying or deviant behavior as compared to other devices within the same class or grouping. For example, such devices may be considered in the same class or grouping based on being made by the same manufacturer, having similar technical specifications such as storage capacity and I/O speeds, built within a specified time period, and the like. For example, a device with a latency profile that is statistically deviant compared to a characteristic profile for other devices of the same class or grouping can indicate a high probability that a failure will occur within a threshold period of time. The system can automatically identify and report potential failures based on thresholds and parameters that are configured via the UI. The failure probability can be adjusted based on actual observed failures. For example, if a machine learning function is used to learn and identify pre-fault behavior, then the behaviors of a failed device before the device failed may be used to further improve the training of the machine learning function.

The behavioral and characteristic data can include the time distribution of I/O latencies as well as other data that can be readily observable or self-reported. Such data can include failure and maintenance data, device temperature, and I/O queue time. The behavioral and characteristic data can be collected across entire populations of devices at the same or across data centers. Characteristic patterns can then be identified that are indicative of failures for various classes of devices, allowing for preemptive device maintenance that can be used to avoid downtime and data loss.

In one embodiment, the characteristic profiles may be developed until they are relatively deterministic with respect to a performance issue for a given parameter and for a given class or type of device. The distribution of I/O latency and other performance characteristics may be used to determine a characteristic performance profile for the given class or type of device. When the characteristic performance profile is determined based on I/O performance information, then the characteristic performance profile may be referred to as a characteristic time-based I/O performance profile.

The measurements may be analyzed using various methods, such as standard deviation or a time-based graph. By comparing the profile of a given device with the characteristic profiles, a status of the device may be determined, such as determining when and if the resource will enter into a faulty performance state. In some embodiments, a difference between the time-based I/O performance profile for the storage device and the characteristic time-based I/O performance profile may be determined. The difference may be referred to as a deviance or a performance deviance. When the difference between the time-based I/O performance profile for the storage device and the characteristic time-based I/O performance profile exceeds a threshold, then the storage device may be considered as being in a pre-marginal state. This threshold may be referred to as a deviance threshold or a predetermined deviance threshold. The threshold may be determined based on an analysis of historical data when devices have previously entered the pre-marginal state. The threshold may further be determined based on heuristics as well as machine learning. The threshold may be a single value, a range of values, or may be represented in other ways such as a table, graph, or a function.

In some embodiments, the threshold may be determined based on a difference between the time-based I/O performance profile for the storage device and the characteristic time-based I/O performance profile at a plurality of time periods.

Figure 4:
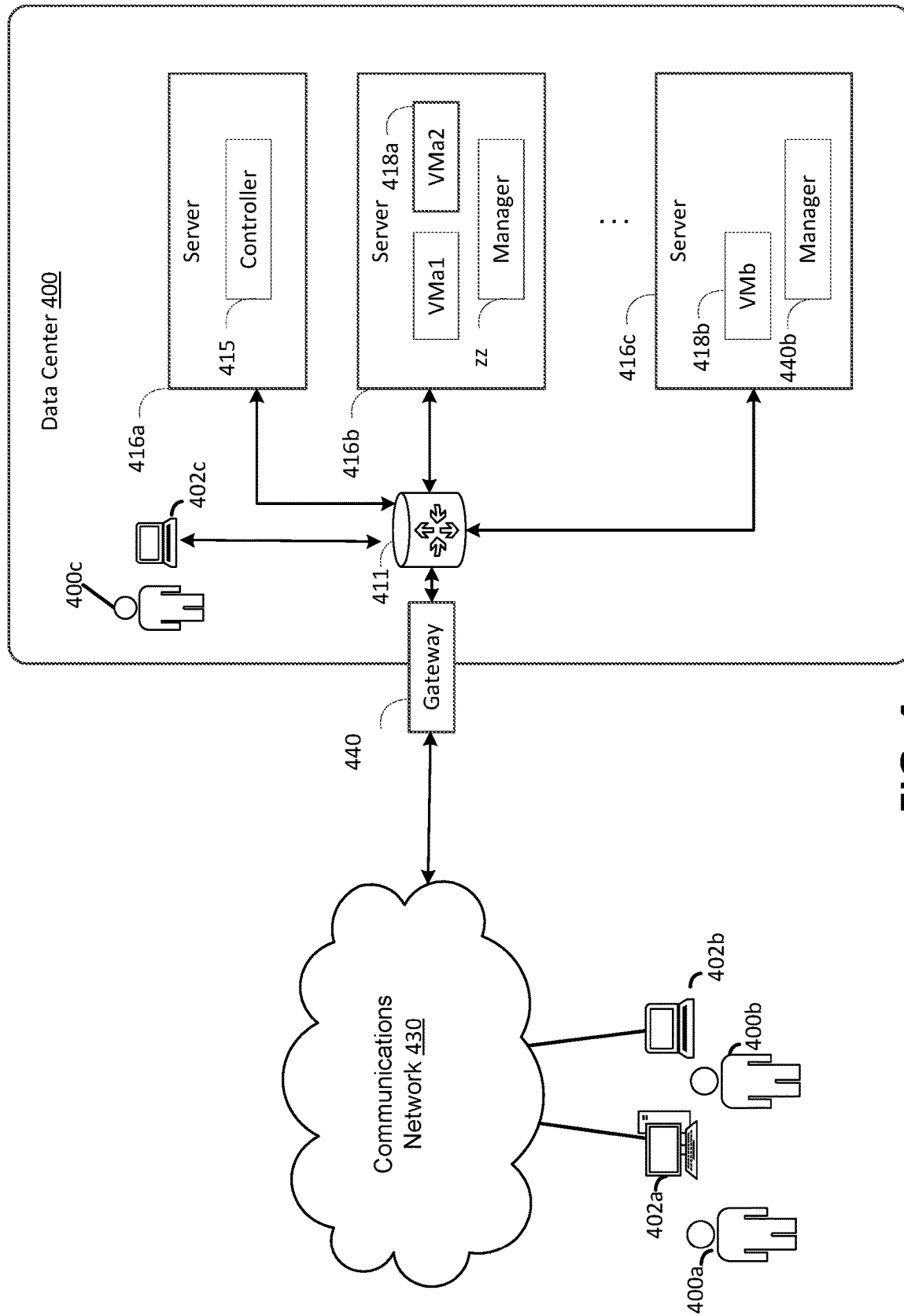
FIG. 4 is a diagram illustrating an example architecture in accordance with the present disclosure.

FIG. 4 illustrates an example computing environment in which the embodiments described herein may be implemented. FIG. 4 illustrates a data center 400 that is configured to provide computing resources to users 400a, 400b, or 400c (which may be referred herein singularly as "a user 400" or in the plural as "the users 400") via user computers 402a, 402b, and 402c (which may be referred herein singularly as "a computer 402" or in the plural as "the computers 402") via a communications network 430. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may include servers 416*a,* 416*b,* and 416*c* (which may be referred to herein singularly as "a server 416" or in the plural as "the servers 416") that provide computing resources available as virtual machines 418*a* and 418*b* (which may be referred to herein singularly as "a virtual machine 418" or in the plural as "the virtual machines 418"). The virtual machines 418 may be configured to execute applications such as Web servers, application servers, media servers, database servers, and the like. Other resources that may be provided include data storage resources (not shown on FIG. 1) and may include file storage devices, block storage devices, and the like. Servers 416 may also execute functions that manage and control allocation of resources in the data center, such as a controller 415. Controller 415 may be a fabric controller or another type of program configured to manage the allocation of virtual machines on servers 416.

Referring to FIG. 4, communications network 430 may, for example, be a publicly accessible network of linked networks and may be operated by various entities, such as the Internet. In other embodiments, communications network 430 may be a private network, such as a corporate network that is wholly or partially inaccessible to the public.

Communications network 430 may provide access to computers 402. Computers 402 may be computers utilized by users 400. Computer 402*a,*402*b* or 402*c* may be a server, a desktop or laptop personal computer, a tablet computer, a smartphone, a set-top box, or any other computing device capable of accessing data center 400. User computer 402*a* or 402*b* may connect directly to the Internet (e.g., via a cable modem). User computer 402*c* may be internal to the data center 400 and may connect directly to the resources in the data center 400 via internal networks. Although only three user computers 402*a,*402*b,* and 402*c* are depicted, it should be appreciated that there may be multiple user computers.

Computers 402 may also be utilized to configure aspects of the computing resources provided by data center 400. For example, data center 400 may provide a Web interface through which aspects of its operation may be configured through the use of a Web browser application program executing on user computer 402. Alternatively, a stand-alone application program executing on user computer 402 may be used to access an application programming interface (API) exposed by data center 400 for performing the configuration operations.

Servers 416 may be configured to provide the computing resources described above. One or more of the servers 416 may be configured to execute a manager 420*a* or 420*b* (which may be referred herein singularly as "a manager 420" or in the plural as "the managers 420") configured to execute the virtual machines. The managers 420 may be a virtual machine monitor (VMM), fabric controller, or another type of program configured to enable the execution of virtual machines 418 on servers 416, for example.

It should be appreciated that although the embodiments disclosed above are discussed in the context of virtualized storage services, other types of implementations can be utilized with the concepts and technologies disclosed herein.

In the example data center 400 shown in FIG. 4, a network device 411 may be utilized to interconnect the servers 416*a* and 416*b*. Network device 411 may comprise one or more switches, routers, or other network devices. Network device 411 may also be connected to gateway 440, which is connected to communications network 430. Network device 411 may facilitate communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
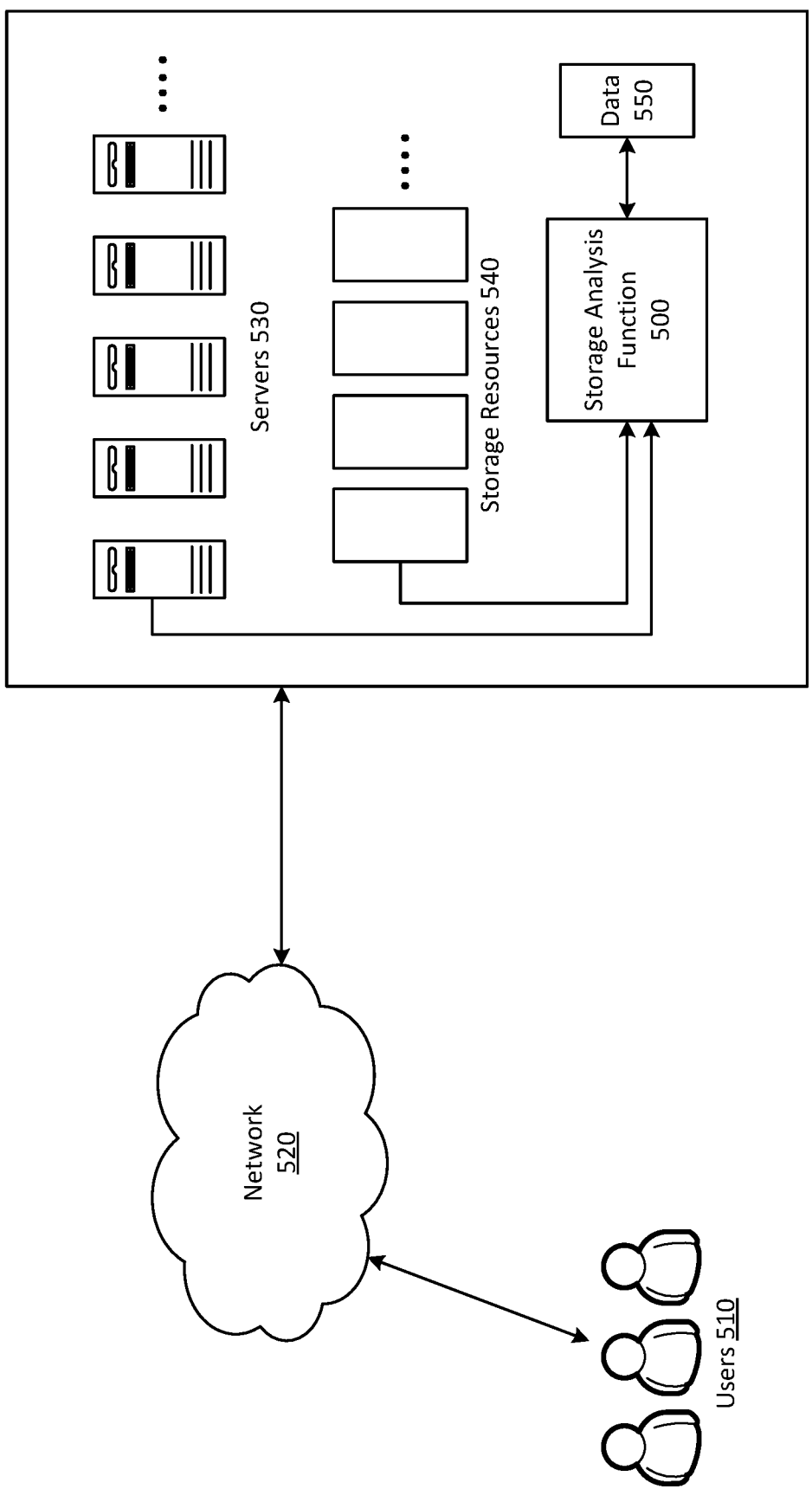
FIG. 5 is a diagram illustrating an example architecture in accordance with the present disclosure.

FIG. 5 is a diagram illustrating a storage analysis function 500 for identifying issues in accordance with the present disclosure. In FIG. 5, a storage analysis function 500 may include resources and applications that may execute, for example, on one or more servers 530. It will be appreciated that some embodiments may involve additional computing resources of various types that may be provided.

FIG. 5 also illustrates a network 520 that may provide communications for one or more computers accessible by users 510. FIG. 5 also illustrates a data store 550 that may store data pertaining to various events and metrics for storage devices 540, such as input/output latencies.

A request may be sent to storage analysis function 500 for monitoring and analyzing one or more storage devices. The storage analysis function 500 may be co-hosted with the servers 530 and data store 550, or may reside on devices of users 510, or a combination thereof. In some embodiments, a request may be received from a device of one of the users 510 for storage analysis. In response to receipt of the request, storage analysis function 500 may log the request and provide updates as to the status of the request. The storage analysis function 500 may communicate with other services to facilitate processing of the request, collection of data pertaining to request, and generating interfaces to provide results of the request. The storage analysis function 500 may, for example, provide an interface for facilitating submission of the request. The storage analysis function 500 may further provide an interface for viewing the results of the request.

Storage analysis function 500 may be configured to provide analysis and diagnostics for identifying devices with potential performance issues and/or predicted failure probabilities based on real time or accumulated and/or archived monitoring of various devices. The storage analysis function 500 may access metrics, such as device type, device usage activity, and device latencies. The storage analysis function 500 may be made accessible via an application programming interface (API) or a user interface that may be accessed via a Web browser or other input mechanisms.

In some embodiments, an expert system that utilizes logical inferences based on available information may be used. An expert system may take available information pertaining to actual failures of devices and use the information as input to a rules-based system to generate updated event probabilities. The available information may be provided to, for example, a Bayesian process to determine an updated probability for the event.

Within this operating environment, storage analysis function 500 may determine a predicted probability of a failure or other performance issue. The analysis may be based on the distribution of data, such as a tail latency. Storage analysis function 500 may gather data from other components of the operating environment, such as data store 550. The storage analysis function 500 may also collect information stored in log files and other locations that may be available from computing resources 540. The information may also be obtained by querying devices for data that is not currently being stored in a log file.

After a potential issue has been identified, an alert may be sent to the user or an automated response may be initiated.

In some embodiments, the storage analysis function 500 may monitor failures and device attributes automatically. For example, the storage analysis function 500 may monitor for a number of pre-selected profiles or events, and may do so at a predetermined frequency.

Additionally, storage analysis function 500 may provide users with the ability to request and receive notifications or to take specified actions depending on the failure events. For example, an off-device service in communication with the storage analysis function 500 may send an SMS message to a user to indicate that a device is predicted to fail. A user interface may be provided to allow access to the storage analysis function 500.

In some embodiments, a time frame for the event prediction may be specified as well as the resources to be evaluated. For example, a user may want to determine the predicted failure rate for a group of devices over a period of one month.

The storage analysis function 500 may provide a detailed analysis and summary of results to a requesting user. In some embodiments, an API may be provided to facilitate requests for event information. For example, an API can be called with information such as a device identifier and specified event. After the API is called, in one embodiment the storage analysis function 500 may take actions such as:

Access previous data for the device.
Retrieve data of related devices.
Call available APIs that can provide metrics for the devices.
Invoke a function to generate a predicted probability of an event.
Using the gathered information, the storage analysis function 500 may analyze the data, combine or aggregate the data or extract portions of the data as appropriate, and invoke a distribution analysis function and/or a probability determination function to generate the predicted probability of an event. The determined event probability may be reported through the API along with details regarding potential causes for the prediction.

In some embodiments, certain parameters of the device can be selected based on biasing to identify parameters that may have greater impact on the failure prediction. For example, a subset of attributes can be weighted to indicate a higher degree of relevance of the attributes to the potential failure of the device.

In some embodiments, an API or a programming interface may be provided for facilitating the submission of storage device analysis requests. The API may be configured to receive electronic messages that encode identifiers indicative of an analysis request for fulfillment by the storage analysis function 500. In response to receiving one of the electronic messages, the API may send second electronic messages indicative of information indicating that request has been received and may provide the results of the analysis.

Figure 6:
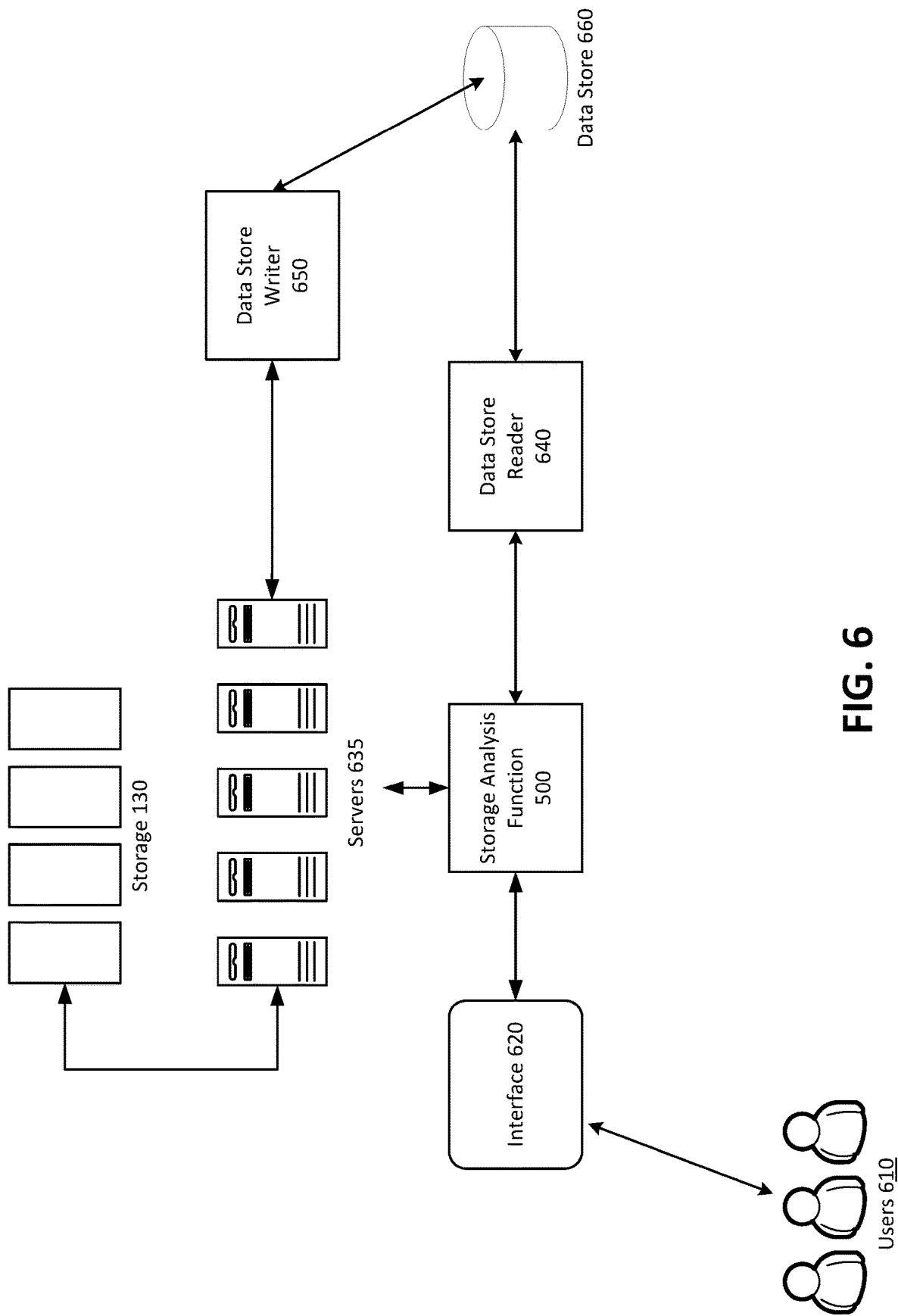
FIG. 6 is a diagram illustrating an example architecture in accordance with the present disclosure.

Referring to FIG. 6, illustrated is an example implementation of functionality associated with a failure prediction engine 500. The failure prediction engine 500 may access, or cause access to, various data such as stored operation data, metrics, and event histories. The failure prediction engine 500 may also generate or cause the generation of data. Users 610 of the service provider may access a user interface 620 for requesting data. In some embodiments, the user interface 620 can be generated by functions implemented in software executing on one or more servers 635. The requested data may be provided to a data store writer 650 that may store the data. A data store reader 640 may be configured to access the data store 660 and retrieve data based on requests from the users 610 or for other purposes. The failure prediction engine 500 may manage the various data that are to be collected. For example, the failure prediction engine 500 may take actions such as invoking a service to retrieve a set of available metrics pertaining to the request and the associated device. The failure prediction engine 500 may also access activity logs for the device, health status for the device, connection states for the device, configurations for the device, and hardware attributes (e.g., manufacturer, date of manufacture, etc.). Other types of data may be accessed as determined by the failure prediction engine 500, such as the type of device, physical location, installed software, usage patterns, and so on.

Figure 7:
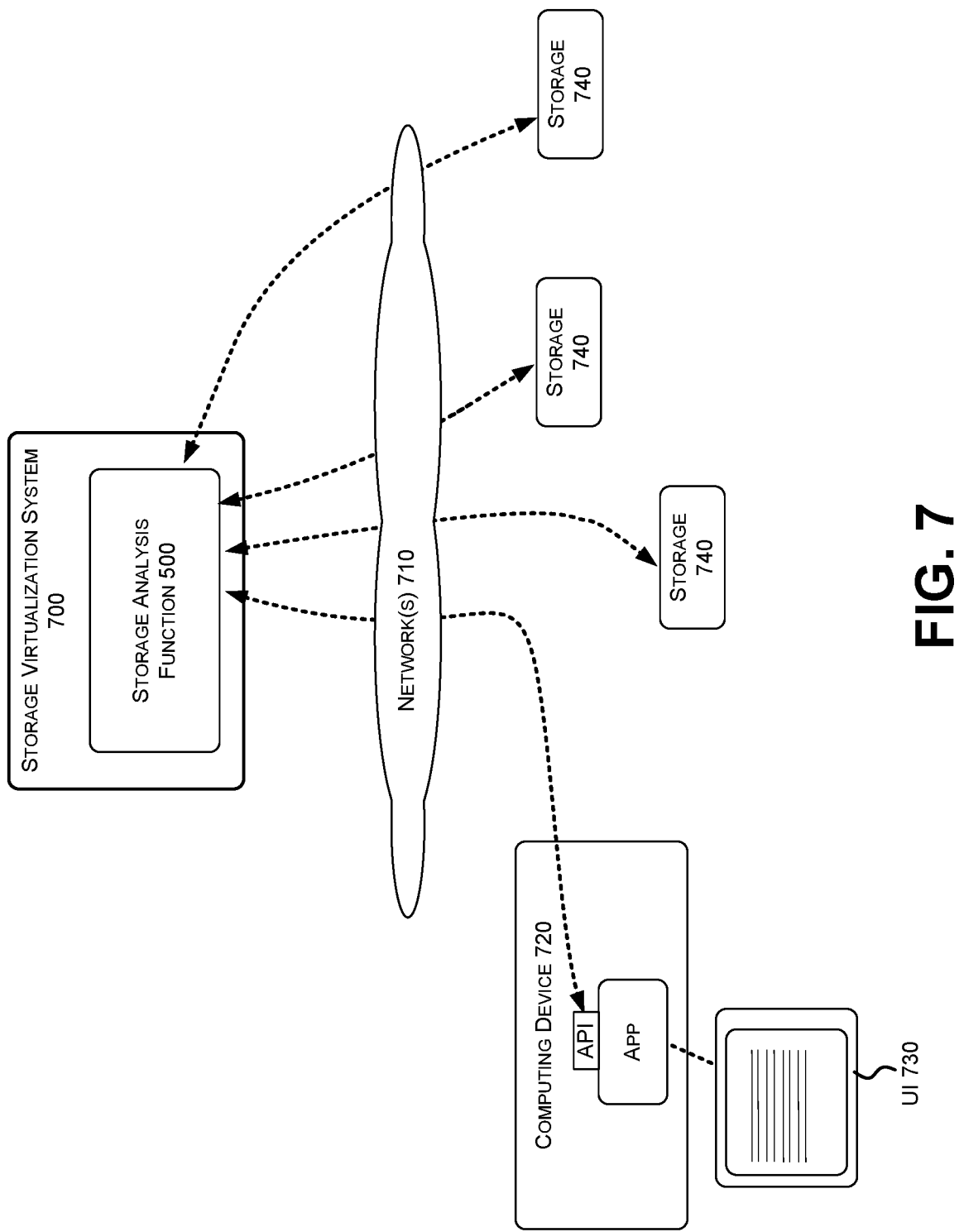
FIG. 7 is a diagram illustrating an example architecture in accordance with the present disclosure.

Referring to FIG. 7, illustrated is an example system for identifying device performance issues. A user interface (UI) 730 may allow interaction with an application running on computing device 720. The application may interact with an API that enables communication, via a network 710, to storage analysis function 500 that may execute in an environment such as a storage virtualization system 700. The storage analysis function 500 may interact with a plurality of storage devices 740.

Figure 8:
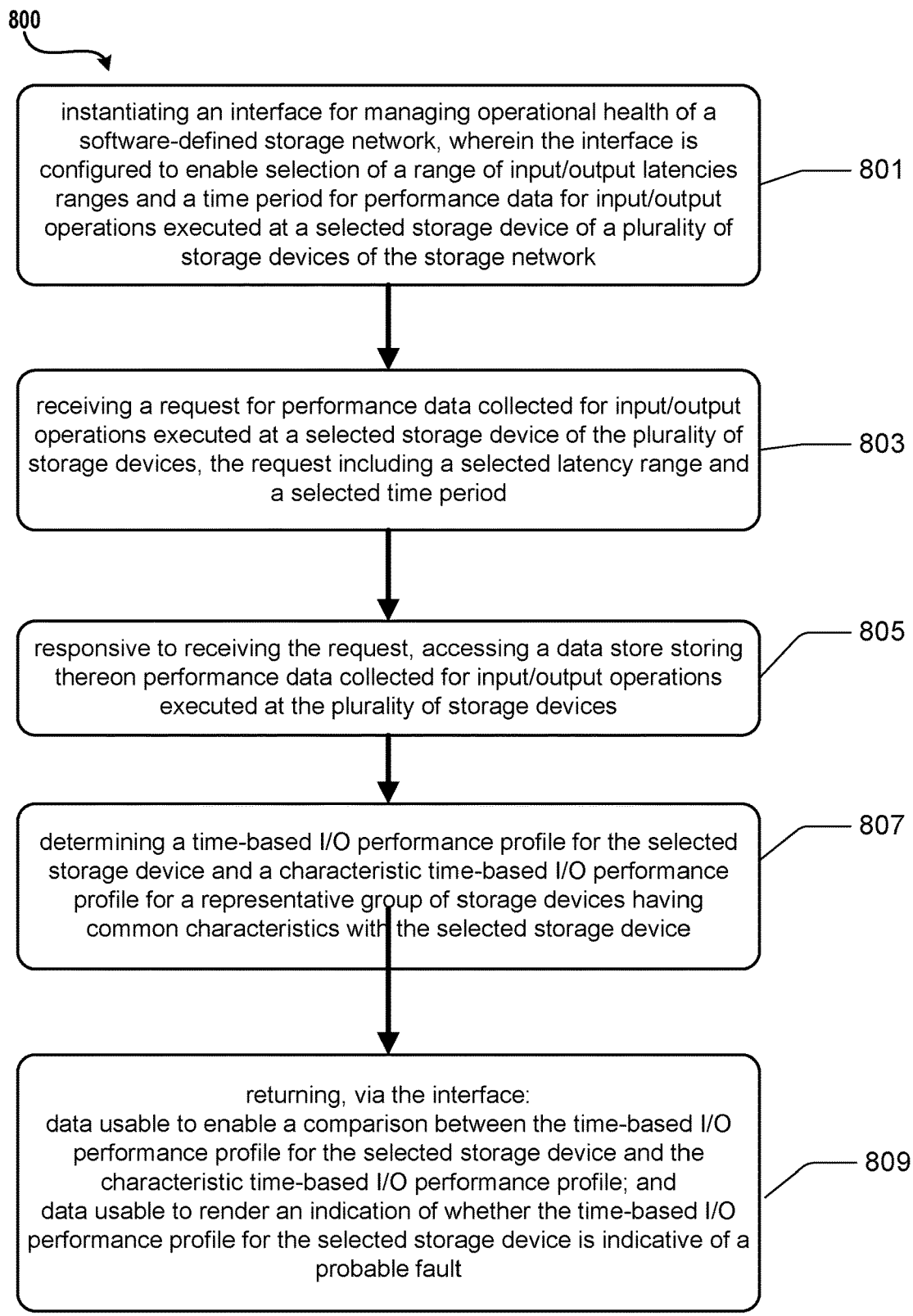
FIG. 8 is a flowchart depicting an example procedure for diagnosing storage issues in accordance with the present disclosure.

Turning now to FIG. 8, illustrated is an example operational procedure for identifying performance issues in a computing environment in accordance with the present disclosure. Such an operational procedure may provide for identifying performance issues and can be provided by functions illustrated, for example, in FIGS. 1-7. The operational procedure may be implemented in a system comprising one or more computing devices. Referring to FIG. 8, operation 800 illustrates collecting performance data for input/output operations executed at a storage device of a plurality of storage devices of a software-defined storage network. Operation 800 may be followed by operation 801. Operation 801 illustrates instantiating an interface for managing operational health of a software-defined storage network. In an embodiment, the interface is configured to enable selection of a range of input/output latencies ranges and a time period for performance data for input/output operations executed at a selected storage device of a plurality of storage devices of the storage network.

Operation 801 may be followed by operation 803. Operation 803 illustrates receiving a request for performance data collected for input/output operations executed at a selected storage device of the plurality of storage devices. In an embodiment, the request includes a selected latency range and a selected time period.

Operation 803 may be followed by operation 805. Operation 805 illustrates responsive to receiving the request, accessing a data store storing thereon performance data collected for input/output operations executed at the plurality of storage devices.

Operation 805 may be followed by operation 807. Operation 807 illustrates based on the accessed performance data and the selected latency range and selected time period, determining a time-based I/O performance profile for the selected storage device and a characteristic time-based I/O performance profile for a representative group of storage devices having common characteristics with the selected storage device.

Operation 807 may be followed by operation 809. Operation 809 illustrates returning, via the interface:

data usable to enable a comparison between the time-based I/O performance profile for the selected storage device and the characteristic time-based I/O performance profile; and data usable to render an indication of whether the time-based I/O performance profile for the selected storage device is indicative of a probable fault.

Figure 9:
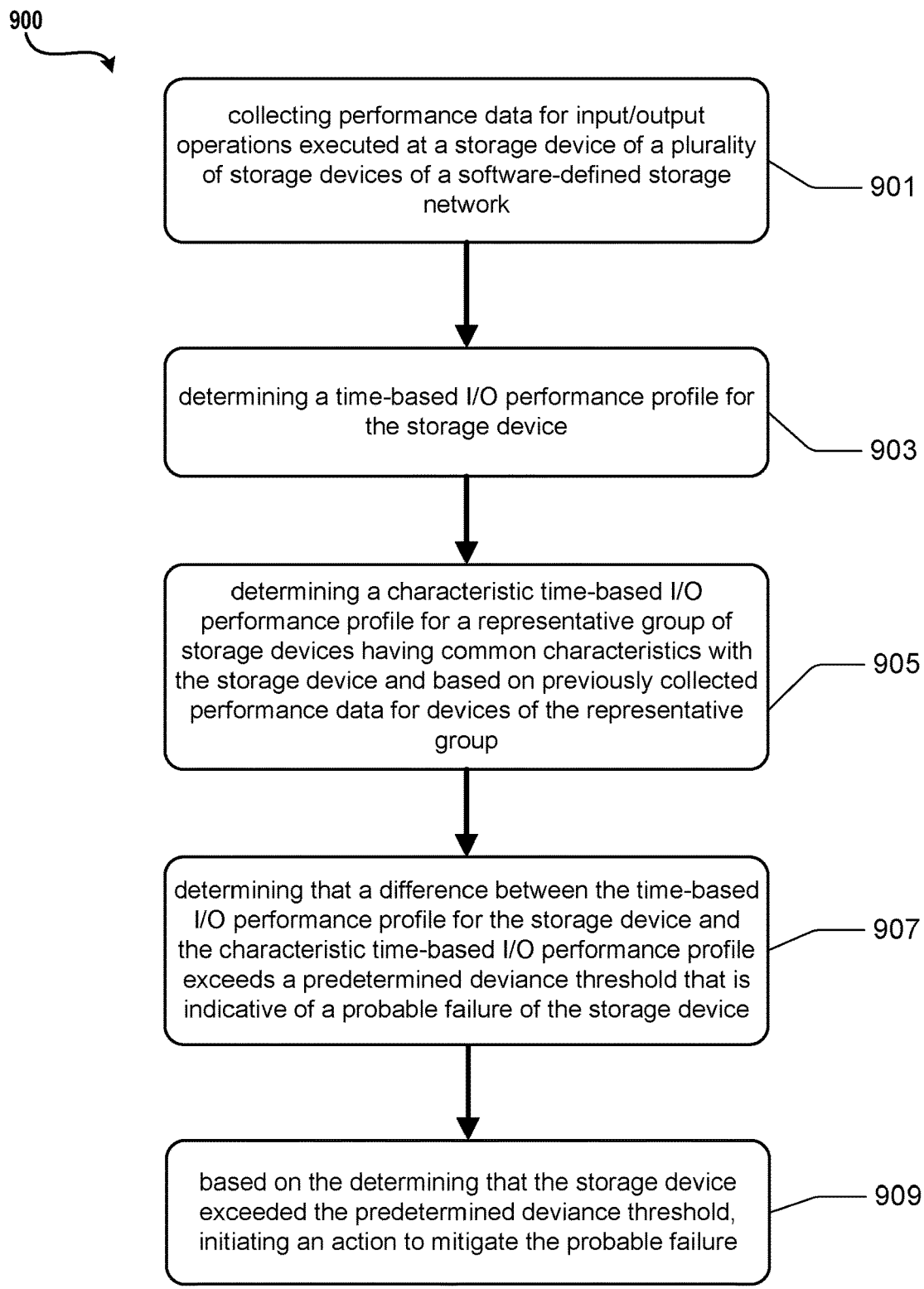
FIG. 9 is a flowchart depicting an example procedure for diagnosing storage issues in accordance with the present disclosure.

Referring to FIG. 9, illustrated is another example operational procedure for identifying storage device issues in a networked environment. Such an operational procedure may provide for identifying performance issues and can be provided by functions illustrated, for example, in FIGS. 1-8. The operational procedure may be implemented in a system comprising one or more computing devices. Referring to FIG. 9, operation 901 illustrates collecting performance data for input/output operations executed at a storage device of a plurality of storage devices of a software-defined storage network.

Operation 901 may be followed by operation 903. Operation 903 illustrates based on the collected performance data, determining a time-based I/O performance profile for the storage device.

Operation 903 may be followed by operation 905. Operation 905 illustrates determining a characteristic time-based I/O performance profile for a representative group of storage devices having common characteristics with the storage device and based on previously collected performance data for devices of the representative group.

Operation 905 may be followed by operation 907. Operation 907 illustrates determining that a difference between the time-based I/O performance profile for the storage device and the characteristic time-based I/O performance profile exceeds a predetermined deviance threshold that is indicative of a probable failure of the storage device.

Operation 907 may be followed by operation 909. Operation 909 illustrates based on the determining that the storage device exceeded the predetermined deviance threshold, initiating an action to mitigate the probable failure.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 10:
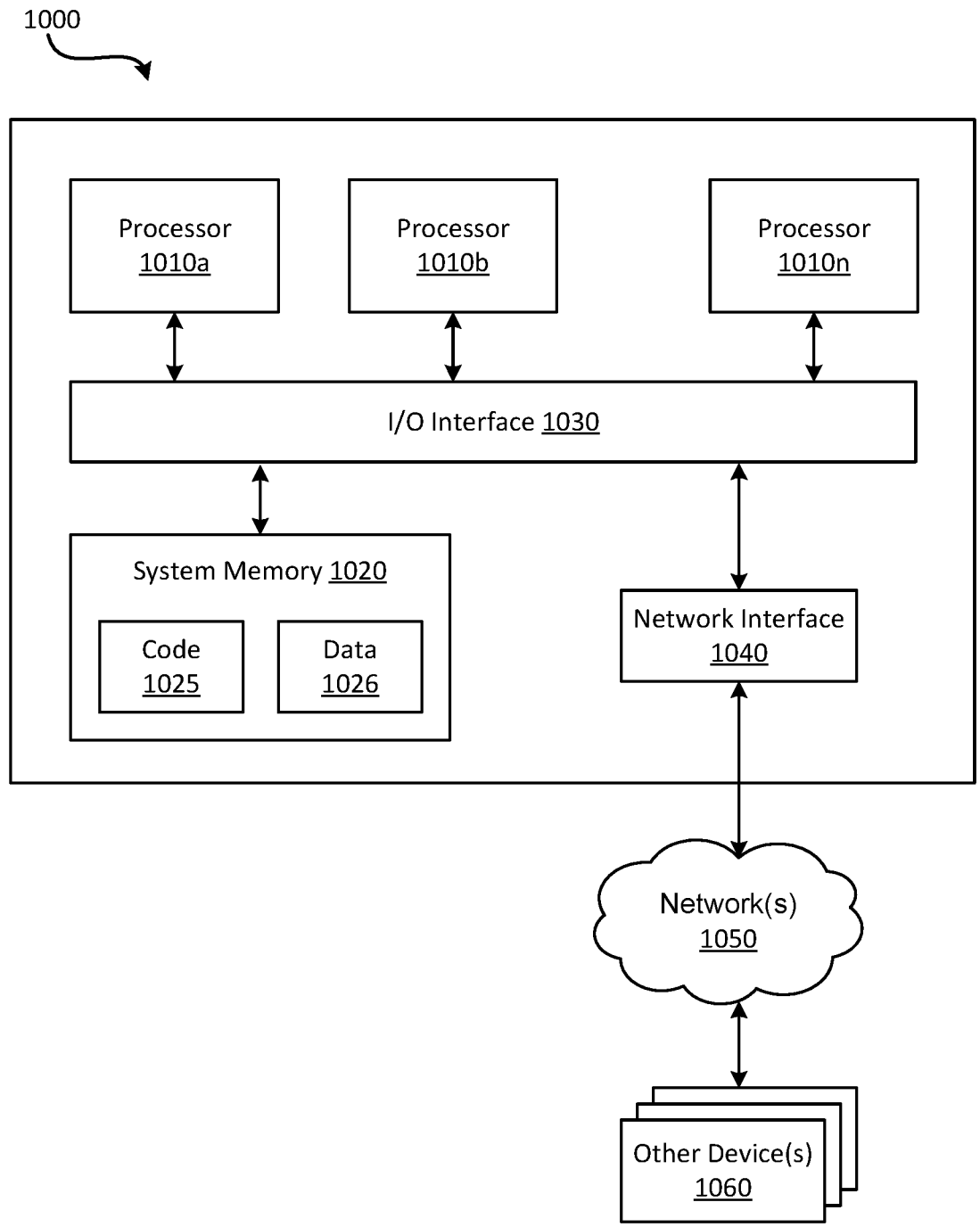
FIG. 10 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 10 illustrates such a general-purpose computing device 1000. In the illustrated embodiment, computing device 1000 includes one or more processors 1010a, 1010b, and/or 1010n (which may be referred herein singularly as "a processor 1010" or in the plural as "the processors 1010") coupled to a system memory 1020 via an input/output (I/O) interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x106, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1020 as code 1025 and data 1026.

In one embodiment, I/O interface 1030 may be configured to coordinate I/O traffic between the processor 1010, system memory 1020, and any peripheral devices in the device, including network interface 1040 or other peripheral interfaces. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or network(s) 1050, such as other computer systems or devices as illustrated in FIGS. 1 through 4, for example. In various embodiments, network interface 1040 may support communication via any suitable wired or wireless general data networks, such as types of Ethernet networks, for example. Additionally, network interface 1040 may support communication via telecommunications/telephony networks such as analog voice networks or digital fiber communications networks, via storage area networks such as Fibre Channel SANs or via any other suitable type of network and/or protocol.

In some embodiments, system memory 1020 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals such as electrical, electromagnetic or digital signals, conveyed via a communication medium such as a network and/or a wireless link, such as may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 10, may include other components that are not explicitly shown in FIG. 10, or may utilize an architecture completely different than that shown in FIG. 10.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein encompasses the subject matter set forth in the following example clauses.

A computer-implemented method comprising:

a. receiving a request for input/output performance data for a plurality of storage devices of a software-defined storage network, the request specifying:

1. a plurality of latency ranges, and 2. a time period for the input/output performance data;

In an embodiment, a client can request data for the total number of I/O operations where the latency for the operations exceeded specified latency thresholds such as greater than 256 us, 1 ms, 4 ms, etc.; the client can request a time period for the I/O latency data, such as over a two-week period.

b. responsive to receiving the request at the interface, accessing a data store storing thereon a historical record of latencies for input/output operations executed at the plurality of storage devices; in an embodiment, a database stores the actual latencies that each I/O operation that was executed at each storage device of the storage network;

c. determining a number of latencies that fall into each of the specified latency ranges and within the specified time period; in an embodiment, a function analyzes the latency records and identifies latencies that exceeded each of the specified latency thresholds and fell within the specified time period;

d. returning, via the interface, data usable to render a histogram indicative of the number of latencies that fall into each of the specified latency ranges and within the specified time period; in an embodiment, the user interface returns data for generating a histogram for the number of latencies that exceeded each of the specified latency thresholds and that occurred during the specified time period.

A computer-implemented method comprising:

a. receiving, at an interface for managing operational health of a plurality of storage devices of a software-defined storage network, a request including an identifier of a selected storage device of the software-defined storage network; in an embodiment, a user interface is instantiated that operates to receive, from a requesting process, an identifier of a selected storage device of the software-defined storage network;

b. responsive to receiving the request at the interface, accessing a data store storing thereon a historical record of latencies for input/output operations executed at the selected storage device of the software-defined storage network; in an embodiment, a database stores the actual latencies for each I/O operation that was executed at each storage device of the storage network;

c. determining a latency profile for the selected storage device, the latency profile determined based on a number of latencies for the selected storage device that fall within each of a plurality of latency ranges and within a selected time period; in an embodiment, a latency profile includes the distribution of the numbers of latencies that fell within each of a plurality of latency ranges (e.g., the total number of I/O operations where the latency was greater than 256 us, 1 ms, 4 ms, etc.) and within a selected time period data (e.g., during the previous two weeks).]

d. determining that a difference between the latency profile for the selected storage device and a characteristic latency profile for a class of storage devices of the software-defined storage network exceeds a predetermined deviance threshold; in an embodiment, a function determines that the difference between the latency profile and a characteristic latency profile for a class of storage devices (e.g., a group of storage devices with the same type of storage such as DIMM and same capacity) exceeds a predetermined deviance threshold (e.g., the highest latency of the device occurred more than 1% of the time and was greater than two standard deviations from the characteristic profile for the class of devices).

e. returning, via the interface, data usable to render an indication that the selected storage device exceeded the predetermined deviance threshold; in an embodiment, the interface returns a notification that the selected storage device exhibited a latency profile that deviated from the characteristic profile of similar devices.

The disclosure presented herein encompasses the subject matter set forth in the following example clauses.

A computer-implemented method comprising:
receiving a request for input/output performance data for a plurality of storage devices of a software-defined storage network, the request specifying:
a plurality of latency ranges, and
a time period for the input/output performance data;
responsive to receiving the request at the interface, accessing a data store storing thereon a historical record of latencies for input/output operations executed at the plurality of storage devices;
determining a number of input/output operations with latencies that fall into each of the specified latency ranges and within the specified time period;
returning, via the interface, data usable to render:
a histogram indicative of the number of latencies that fall into each of the specified latency ranges and within the specified time period; and
an indication that one or more of the specified latency ranges have exceeded a threshold indicated of a failure.

A computer-implemented method comprising:
receiving, at an interface for managing operational health of a plurality of storage devices of a software-defined storage network, a request including an identifier of a selected storage device of the software-defined storage network;
responsive to receiving the request at the interface, accessing a data store storing thereon a historical record of latencies for input/output operations executed at the selected storage device of the software-defined storage network;
determining a latency profile for the selected storage device, the latency profile determined based on a number of latencies for the selected storage device that fall within each of a plurality of latency ranges and within a selected time period;
determining that a difference between the latency profile for the selected storage device and a characteristic latency profile for a class of storage devices of the software-defined storage network exceeds a predetermined deviance threshold; and
returning, via the interface, data usable to render an indication that the selected storage device exceeded the predetermined deviance threshold.

EXAMPLE CLAUSES

The disclosure presented herein encompasses the subject matter set forth in the following example clauses.

Example Clause A, a computer-implemented method for operating a storage network, the method comprising:
instantiating an interface for managing operational health of a software-defined storage network, wherein the interface is configured to enable selection of a range of input/output latencies ranges and a time period for performance data for input/output operations executed at a selected storage device of a plurality of storage devices of the storage network;
receiving a request for performance data collected for input/output operations executed at a selected storage device of the plurality of storage devices, the request including a selected latency range and a selected time period;
responsive to receiving the request, accessing a data store storing thereon performance data collected for input/output operations executed at the plurality of storage devices;
based on the accessed performance data and the selected latency range and selected time period, determining a time-based I/O performance profile for the selected storage device and a characteristic time-based I/O performance profile for a representative group of storage devices having common characteristics with the selected storage device; and
returning, via the interface:
data usable to enable a comparison between the time-based I/O performance profile for the selected storage device and the characteristic time-based I/O performance profile; and
data usable to render an indication of whether the time-based I/O performance profile for the selected storage device is indicative of a probable fault.

Example Clause B, the computer-implemented method of Example Clause A, further comprising returning, via the interface, data usable to render a deviance threshold that is determined based on a difference between the time-based I/O performance profile for the storage device and the characteristic time-based I/O performance profile.

Example Clause C, the computer-implemented method of any one of Example Clauses A through B, wherein the performance data comprises latencies for I/O operations that were executed at the storage device.

Example Clause D, the computer-implemented method of any one of Example Clauses A through C, wherein the time-based I/O performance profile comprises a distribution of numbers of metrics that fell within each of a plurality of metric ranges.

Example Clause E, the computer-implemented method of any one of Example Clauses A through D, wherein the time-based I/O performance profile comprises.

Example Clause F, the computer-implemented method of any one of Example Clauses A through E, wherein the data usable to render a histogram indicative of a count of latencies that fall into latencies of the selected latency range and within the selected time period.

While Example Clauses A through F are described above with respect to a computer-implemented method, it is understood in the context of this disclosure that the subject matter of Example Clauses A through F can additionally or alternatively be implemented by a system or device or computer readable medium.

Example Clause G, a computing device comprising:
one or more processors;
a memory in communication with the one or more processors, the memory having computer-readable instructions stored thereupon which, when executed by the one or more processors, cause the computing device perform operations comprising:
receiving a request for performance data for input/output operations executed at a storage device of a plurality of storage devices of a software-defined storage network, the request including a selected latency range and a selected time period;

responsive to receiving the request, accessing a data store storing thereon a historical record of latencies for input/output operations executed at the plurality of storage devices;

based on the accessed data, determining a time-based I/O performance profile for the storage device that is based on one or more performance metrics for the storage device at the selected latency range and selected time period;

determining a characteristic time-based I/O performance profile for a representative group of storage devices having common characteristics with the storage device;

returning data usable to render:

a visual representation of the time-based I/O performance profile for the storage device and the characteristic time-based I/O performance profile; and a visual representation of a predetermined deviance threshold that is indicative of the storage device entering a marginal performance state.

Example Clause H, the system of Example Clause G, wherein data further comprises data usable to render a probability that the storage device will enter a marginal performance state exceeds a predetermined threshold.

Example Clause I, the system of any one of Example Clauses G through H, wherein the probability is determined in part on a difference between the time-based I/O performance profile for the storage device and the characteristic time-based I/O performance profile for the representative group of storage devices.

Example Clause J, the system of any one of Example Clauses G through I, wherein the request includes a plurality of latency ranges, and a time period for the input/output operations.

Example Clause K, the system of any one of Example Clauses G through J, wherein the time-based I/O performance profile comprises a total number of I/O operations where associated latencies were greater than a threshold.

Example Clause L, the system of any one of Example Clauses G through K, wherein the plurality of storage devices is an erasure coding group or a group of mirrored devices.

Example Clause M, the system of any one of Example Clauses G through L, wherein the data usable to render a histogram indicative of a number of latencies that fall into each of specified latency ranges and within a specified time period.

Example Clause N, the system of any one of Example Clauses G through M, wherein the probability is determined in part on a time-based distribution of latencies for I/O operations associated with the storage device.

Example Clause O, the system of any one of Example Clauses G through N, wherein the probability is determined in part on latencies for I/O operations associated with the storage device that have exceeded a threshold value.

Example Clause P, the system of any one of Example Clauses G through O, wherein the time-based I/O performance profile comprises a distribution of numbers of metrics that fell within each of a plurality of metric ranges.

Example Clause Q, the system of any one of Example Clauses G through P, wherein the determining that the storage device is no longer in the marginal performance state is based on determining that latencies for I/O operations associated with the storage device have not exceeded a predetermined threshold for a specified time period.

While Example Clauses G through Q are described above with respect to a system, it is understood in the context of this disclosure that the subject matter of Example Clauses G through Q can additionally or alternatively be implemented by a device3 or method or computer readable medium.

Example Clause R, a computer-readable medium having encoded thereon computer-executable instructions that, when executed, cause one or more processing units of a computing device to execute a method comprising:

receiving a request for performance data for input/output operations executed at a storage device of a plurality of storage devices of a software-defined storage network, the request specifying a selected latency range and selected time period;

responsive to receiving the request, accessing a data store storing thereon a historical record of latencies for input/output operations executed at the plurality of storage devices;

based on the accessed data, determining a time-based I/O performance profile for the storage device, the I/O performance profile determined based on performance metrics for the storage device at the selected latency range and selected time period;

determining a characteristic time-based I/O performance profile for a representative group of storage devices having common characteristics with the storage device; and returning data usable to render the time-based I/O performance profile for the storage device and the characteristic time-based I/O performance profile.

Example Clause S, the computer-readable medium of Example Clause R, further comprising returning, via the interface, data usable to render predetermined deviance threshold that is indicative of the storage device entering a marginal performance state.

Example Clause T, the computer-readable medium of any one of Example Clauses R through S, wherein the time-based I/O performance profile comprises a distribution of numbers of metrics that fell within each of a plurality of metric ranges.

While Example Clauses R through T are described above with respect to a computer-readable medium, it is understood in the context of this disclosure that the subject matter of Example Clauses R through T can additionally or alternatively be implemented by a method or via a device or via a system.

The disclosure presented herein encompasses the subject matter set forth in the following example clauses.

Example Clause AA, a computer-implemented method for predicting a state of a storage device, the method comprising:

collecting performance data for input/output operations executed at a storage device of a plurality of storage devices of a software-defined storage network;

based on the collected performance data, determining a time-based I/O performance profile for the storage device;

determining a characteristic time-based I/O performance profile for a representative group of storage devices having common characteristics with the storage device and based on previously collected performance data for devices of the representative group;

determining that a difference between the time-based I/O performance profile for the storage device and the characteristic time-based I/O performance profile exceeds a predetermined deviance threshold that is indicative of a probable failure of the storage device; and based on the determining that the storage device exceeded the predetermined deviance threshold initiating an action to mitigate the probable failure.

Example Clause BB, the system of Example Clause AA, wherein the plurality of storage devices are configured to implement a fault resiliency function.

Example Clause CC, the system of any one of Example Clauses AA through BB, wherein the plurality of storage devices is an erasure coding group or a group of mirrored devices.

Example Clause DD, the system of any one of Example Clauses AA through CC, wherein the collected performance data comprises latencies for I/O operations that were executed at the storage device.

Example Clause EE, the system of any one of Example Clauses AA through DD, wherein the time-based I/O performance profile comprises a distribution of numbers of metrics that fell within each of a plurality of metric ranges.

Example Clause FF, the system of any one of Example Clauses AA through EE, wherein the time-based I/O performance profile comprises a total number of I/O operations where associated latencies were greater than a threshold.

Example Clause GG, the system of any one of Example Clauses AA through FF, wherein the time-based I/O performance profile for the storage device comprises a latency profile that is determined based on a number of latencies for the storage device that fall within each of a plurality of latency ranges and within a selected time period.

While Example Clauses AA through GG are described above with respect to a system, it is understood in the context of this disclosure that the subject matter of Example Clauses AA through GG can additionally or alternatively be implemented by a method or device.

Example Clause HH, a computing device comprising:
one or more processors;
a memory in communication with the one or more processors, the memory having computer-readable instructions stored thereupon which, when executed by the one or more processors, cause the computing device perform operations comprising:
determining an I/O performance profile for a storage device, the I/O performance profile determined based on one or more performance metrics for the storage device;
based on the I/O performance profile and a characteristic I/O performance profile for a representative group of storage devices having common characteristics with the storage device, determining that a probability that the storage device will enter a fault state exceeds a predetermined threshold; and
based on the probability that the storage device exceeding the predetermined threshold, identifying the storage device for failure mitigation.

Example Clause II, the system of Example Clause HH, wherein the probability is determined in part on a difference between the I/O performance profile for the storage device and the characteristic I/O performance profile for the representative group of storage devices.

Example Clause JJ, the system of any one of Example Clauses HH through II, wherein the storage device is part of a group of storage devices that are configured to implement a fault resiliency function.

Example Clause KK, the system of any one of Example Clauses HH through JJ, wherein the fault resiliency function is mirroring or erasure coding.

Example Clause LL, the system of any one of Example Clauses HH through KK, wherein the probability is determined in part on a time-based distribution of latencies for I/O operations associated with the storage device.

Example Clause MM, the system of any one of Example Clauses HH through LL, wherein the probability is determined in part on latencies for I/O operations associated with the storage device that have exceeded a threshold value.

Example Clause NN, the system of any one of Example Clauses HH through MM, further comprising determining that the probability that the storage device will enter the fault state has not exceeded the predetermined threshold for a specified time period.

While Example Clauses HH through NN are described above with respect to a system, it is understood in the context of this disclosure that the subject matter of Example Clauses HH through NN can additionally or alternatively be implemented by a method or device or computer readable medium.

Example Clause OO, a computer-readable medium having encoded thereon computer-executable instructions that, when executed, cause one or more processing units of a computing device to execute a method comprising:
collecting performance data for input/output operations executed at a storage device of a group of storage devices of a storage network;
based on the collected performance data, determining a time-based I/O performance profile for the storage device;
determining a characteristic time-based I/O performance profile for a representative group of storage devices having common characteristics with the storage device;
determining that a difference between the time-based I/O performance profile for the storage device and the characteristic time-based I/O performance profile exceeds a predetermined deviance threshold that is indicative of the storage device entering a fault state; and
in response to determining that the difference exceeds the predetermined deviance threshold, initiating performance of at least one maintenance action for the storage device.

Example Clause PP, the computer-readable medium of Example Clause OO, wherein the performance data comprise latencies for I/O operations that were executed at the group of storage devices.

Example Clause QQ, the computer-readable medium of any one of Example Clauses OO through PP, wherein the time-based I/O performance profile comprises a distribution of numbers of metrics that fell within each of a plurality of metric ranges.

Example Clause RR, the computer-readable medium of any one of Example Clauses OO through QQ, wherein the time-based I/O performance profile comprises a total number of I/O operations where associated latencies were greater than a threshold.

Example Clause SS, the computer-readable medium of any one of Example Clauses OO through RR, wherein the time-based I/O performance profile for the storage device comprises a latency profile is determined based on a number of latencies for the storage device that fall within each of a plurality of latency ranges and within a selected time period.

Example Clause TT, the computer-readable medium of any one of Example Clauses OO through SS, wherein the group of storage devices are configured to implement a fault resiliency function.

While Example Clauses OO through TT are described above with respect to a computer-readable medium, it is understood in the context of this disclosure that the subject matter of Example Clauses OO through TT can additionally or alternatively be implemented by a method or via a device or via a system.

What is claimed is:
1. A computer-implemented method for operating a storage network, the method comprising:

instantiating an interface for managing operational health of a software-defined storage network, wherein the interface is configured to enable selection of a range of input/output latency ranges and a time period for performance data for input/output operations executed at a selected storage device of a plurality of storage devices of the storage network;

receiving a request for performance data collected for input/output operations executed at a selected storage device of the plurality of storage devices, the request including a selected latency range and a selected time period;

responsive to receiving the request, accessing a data store storing thereon performance data collected for input/output operations executed at the plurality of storage devices;

based on the accessed performance data and the selected latency range and selected time period, determining a time-based I/O performance profile for the selected storage device and a characteristic time-based I/O performance profile for a representative group of storage devices having common characteristics with the selected storage device; and returning, via the interface:
- data usable to enable a comparison between the time-based I/O performance profile for the selected storage device and the characteristic time-based I/O performance profile; and
- data usable to render an indication of whether the time-based I/O performance profile for the selected storage device is indicative of a probable fault.

2. The computer-implemented method of claim 1, further comprising returning, via the interface, data usable to render a deviance threshold that is determined based on a difference between the time-based I/O performance profile for the storage device and the characteristic time-based I/O performance profile.

3. The computer-implemented method of claim 1, wherein the performance data comprises latencies for I/O operations that were executed at the storage device.

4. The computer-implemented method of claim 1, wherein the time-based I/O performance profile comprises a distribution of numbers of metrics that fell within each of a plurality of metric ranges.

5. The computer-implemented method of claim 1, wherein the time-based I/O performance profile comprises a total number of I/O operations where associated latencies were greater than a threshold.

6. The computer-implemented method of claim 1, wherein the data is usable to render a histogram indicative of a count of latencies that fall into latencies of the selected latency range and fall within the selected time period.

7. A computing device comprising:
one or more processors;
a memory in communication with the one or more processors, the memory having computer-readable instructions stored thereupon which, when executed by the one or more processors, cause the computing device perform operations comprising:
receiving a request for performance data for input/output operations executed at a storage device of a plurality of storage devices of a software-defined storage network, the request including a selected latency range and a selected time period;

responsive to receiving the request, accessing a data store storing thereon a historical record of latencies for input/output operations executed at the plurality of storage devices;

based on the accessed data, determining a time-based I/O performance profile for the storage device that is based on one or more performance metrics for the storage device at the selected latency range and selected time period;

determining a characteristic time-based I/O performance profile for a representative group of storage devices having common characteristics with the storage device;

returning data usable to render:
- a visual representation of the time-based I/O performance profile for the storage device and the characteristic time-based I/O performance profile; and
- a visual representation of a predetermined deviance threshold that is indicative of the storage device entering a marginal performance state.

8. The computing device of claim 7, wherein data further comprises data usable to render a probability that the storage device will enter a marginal performance state exceeds a predetermined threshold.

9. The computing device of claim 8, wherein the probability is determined in part on a difference between the time-based I/O performance profile for the storage device and the characteristic time-based I/O performance profile for the representative group of storage devices.

10. The computing device of claim 7, wherein the request includes a plurality of latency ranges, and a time period for the input/output operations.

11. The computing device of claim 7, wherein the time-based I/O performance profile comprises a total number of I/O operations where associated latencies were greater than a threshold.

12. The computing device of claim 10, wherein the plurality of storage devices is an erasure coding group or a group of mirrored devices.

13. The computing device of claim 10, wherein the data is usable to render a histogram indicative of a number of latencies that fall into each of specified latency ranges and fall within a specified time period.

14. The computing device of claim 8, wherein the probability is determined in part on a time-based distribution of latencies for I/O operations associated with the storage device.

15. The computing device of claim 8, wherein the probability is determined in part on latencies for I/O operations associated with the storage device that have exceeded a threshold value.

16. The computing device of claim 7, wherein the time-based I/O performance profile comprises a distribution of numbers of metrics that fell within each of a plurality of metric ranges.

17. The computing device of claim 16, wherein the determining that the storage device is no longer in the marginal performance state is based on determining that latencies for I/O operations associated with the storage device have not exceeded a predetermined threshold for a specified time period.

18. A computer-readable medium having encoded thereon computer-executable instructions that, when executed, cause one or more processing units of a computing device to execute a method comprising:
receiving a request for performance data for input/output operations executed at a storage device of a plurality of storage devices of a software-defined storage network, the request specifying a selected latency range and selected time period;

responsive to receiving the request, accessing a data store storing thereon a historical record of latencies for input/output operations executed at the plurality of storage devices;

based on the accessed data, determining a time-based I/O performance profile for the storage device, the I/O performance profile determined based on performance metrics for the storage device at the selected latency range and selected time period;

determining a characteristic time-based I/O performance profile for a representative group of storage devices having common characteristics with the storage device; and returning data usable to render the time-based I/O performance profile for the storage device and the characteristic time-based I/O performance profile.

19. The computer-readable medium of claim 18, further comprising returning, via the interface, data usable to render predetermined deviance threshold that is indicative of the storage device entering a marginal performance state.

20. The computer-readable medium of claim 18, wherein the time-based I/O performance profile comprises a distribution of numbers of metrics that fell within each of a plurality of metric ranges.

* * * * *